US012634241B2

(12) United States Patent
Aravinthan et al.

(10) Patent No.: US 12,634,241 B2
(45) Date of Patent: May 19, 2026

(54) SYSTEM AND METHOD FOR USING DYNAMIC THRESHOLDS WITH ROUTE ISOLATION FOR HETEROGENEOUS TRAFFIC IN SHARED MEMORY PACKET BUFFERS

(71) Applicant: Enfabrica Corporation, Mountain View, CA (US)

(72) Inventors: Ari Aravinthan, Mountain View, CA (US); Mike Jorda, Mountain View, CA (US); Shimon Muller, Mountain View, CA (US); Shrijeet Mukherjee, Mountain View, CA (US); Jay Peterson, Mountain View, CA (US); Gurjeet Singh, Mountain View, CA (US); Abhishek Jaiswal, Mountain View, CA (US)

(73) Assignee: Enfabrica Corporation, Mountain View, CA (US)

( * ) Notice: Subject to any disclaimer, the term of this patent is extended or adjusted under 35 U.S.C. 154(b) by 541 days.

(21) Appl. No.: 18/107,324

(22) Filed: Feb. 8, 2023

(65) Prior Publication Data

US 2023/0254259 A1 Aug. 10, 2023

Related U.S. Application Data

(60) Provisional application No. 63/307,952, filed on Feb. 8, 2022.

(51) Int. Cl.
*H04L 47/10* (2022.01)
*H04L 47/24* (2022.01)
(Continued)

(52) U.S. Cl.
CPC .............. *H04L 47/29* (2013.01); *H04L 47/24* (2013.01); *H04L 47/32* (2013.01); *H04L 49/9036* (2013.01)

(58) Field of Classification Search
CPC ......... H04L 47/24; H04L 47/29; H04L 47/32; H04L 47/522; H04L 47/528;
(Continued)

(56) References Cited

U.S. PATENT DOCUMENTS 6,034,945 A * 3/2000 Hughes ............... H04L 12/5601
370/235
6,092,115 A * 7/2000 Choudhury ........... H04L 69/163
709/235
(Continued)

FOREIGN PATENT DOCUMENTS

EP 2768188 A1 8/2014
EP 3661141 A1 6/2020
(Continued)

OTHER PUBLICATIONS

U.S. Appl. No. 17/570,261, filed Jan. 6, 2022, Server Fabric Adapter For I/O Scaling Of Heterogeneous And Accelerated Compute Systems, Rochan Sankar, et al.
(Continued)

*Primary Examiner* — Wutchung Chu
(74) *Attorney, Agent, or Firm* — Foley & Lardner LLP

(57) ABSTRACT

A system and method for managing shared memory packet buffers is disclosed. In some embodiments, the system is configured to receive and classify a packet as one of: network-network, network-host, host-network, or host-host; select a minimum guarantee space for the packet according to the classification thereof; if the selected minimum guarantee space is available, store the packet therein; otherwise, if a dedicated shared space is available, store the packet
(Continued)

therein; otherwise, if a global shared space is available, store the packet therein; and otherwise, drop the packet.

20 Claims, 14 Drawing Sheets

(51) Int. Cl.
 *H04L 47/32* (2022.01)
 *H04L 49/90* (2022.01)

(58) Field of Classification Search
 CPC ... H04L 49/9036; H04L 47/15; H04L 47/621;
 H04L 49/9021; H04L 47/10
 See application file for complete search history.

(56) References Cited

U.S. PATENT DOCUMENTS

| | | | |
|---|---|---|---|
| 6,594,712 B1 | 7/2003 | Pettey et al. | |
| 6,667,974 B1 | 12/2003 | Shigeta | |
| 7,181,541 B1 | 2/2007 | Burton et al. | |
| 7,191,225 B1* | 3/2007 | Borthakur | G06F 16/10 |
| | | | 709/248 |
| 7,245,586 B2* | 7/2007 | Bitar | H04L 47/50 |
| | | | 370/235 |
| 7,293,129 B2 | 11/2007 | Johnsen et al. | |
| 7,697,422 B1* | 4/2010 | Arad | H04L 47/10 |
| | | | 370/252 |
| 7,937,447 B1 | 5/2011 | Cohen et al. | |
| 8,234,407 B2* | 7/2012 | Sugumar | G06F 12/1081 |
| | | | 710/308 |
| 8,301,717 B2 | 10/2012 | Deshpande | |
| 8,719,456 B2 | 5/2014 | Wilkinson | |
| 8,917,734 B1 | 12/2014 | Brown | |
| 9,049,265 B1 | 6/2015 | Greenfield et al. | |
| 9,164,702 B1 | 10/2015 | Nesbit et al. | |
| 9,275,071 B2 | 3/2016 | O'Hare et al. | |
| 9,448,901 B1 | 9/2016 | Aslam et al. | |
| 9,648,102 B1 | 5/2017 | Davis et al. | |
| 9,684,597 B1 | 6/2017 | Eiriksson | |
| 9,864,519 B2 | 1/2018 | Meyer et al. | |
| 9,934,152 B1 | 4/2018 | Bryant et al. | |
| 10,152,428 B1 | 12/2018 | Alshawabkeh et al. | |
| 10,169,279 B2 | 1/2019 | Yokoyama | |
| 10,374,945 B1 | 8/2019 | Dhanabalan et al. | |
| 10,447,767 B2 | 10/2019 | Baptist et al. | |
| 10,503,658 B2 | 12/2019 | Basu et al. | |
| 10,778,521 B2 | 9/2020 | Liguori et al. | |
| 10,880,204 B1 | 12/2020 | Shalev et al. | |
| 10,931,588 B1* | 2/2021 | Matthews | G06N 3/098 |
| 10,944,660 B2 | 3/2021 | Hurson et al. | |
| 11,934,318 B2 | 3/2024 | Fan et al. | |
| 11,947,483 B2 | 4/2024 | Helps et al. | |
| 11,972,292 B1 | 4/2024 | Fan | |
| 12,450,177 B2* | 10/2025 | Bataineh | G06F 9/505 |
| 2001/0046212 A1 | 11/2001 | Nakajima | |
| 2002/0071450 A1 | 6/2002 | Gasbarro et al. | |
| 2002/0078271 A1 | 6/2002 | Berry | |
| 2002/0129272 A1 | 9/2002 | Terrell et al. | |
| 2002/0141427 A1* | 10/2002 | McAlpine | H04L 49/50 |
| | | | 370/413 |
| 2002/0159385 A1 | 10/2002 | Susnow et al. | |
| 2002/0184452 A1 | 12/2002 | Simmons et al. | |
| 2002/0191599 A1 | 12/2002 | Parthasarathy et al. | |
| 2003/0058875 A1 | 3/2003 | Arndt et al. | |
| 2003/0117958 A1* | 6/2003 | Nation | H04L 47/10 |
| | | | 370/235 |
| 2003/0154412 A1 | 8/2003 | Hetzler et al. | |
| 2004/0049603 A1 | 3/2004 | Boyd et al. | |
| 2005/0068798 A1 | 3/2005 | Lee et al. | |
| 2005/0080920 A1 | 4/2005 | Bender et al. | |
| 2005/0089033 A1 | 4/2005 | Gupta et al. | |
| 2005/0223118 A1 | 10/2005 | Tucker et al. | |
| 2006/0004941 A1 | 1/2006 | Shah et al. | |
| 2006/0056308 A1 | 3/2006 | Gusat et al. | |
| 2006/0056405 A1 | 3/2006 | Chang et al. | |
| 2006/0059242 A1 | 3/2006 | Blackmore et al. | |
| 2006/0062232 A1* | 3/2006 | Kumar | H04L 47/32 |
| | | | 370/412 |
| 2006/0090014 A1 | 4/2006 | Wong et al. | |
| 2006/0092837 A1* | 5/2006 | Kwan | H04L 47/266 |
| | | | 370/468 |
| 2006/0236063 A1 | 10/2006 | Hausauer et al. | |
| 2006/0242352 A1 | 10/2006 | Torudbakken et al. | |
| 2006/0251109 A1* | 11/2006 | Muller | H04L 47/30 |
| | | | 370/463 |
| 2006/0253619 A1 | 11/2006 | Torudbakken et al. | |
| 2006/0271713 A1 | 11/2006 | Xie et al. | |
| 2007/0038794 A1 | 2/2007 | Purcell et al. | |
| 2007/0104102 A1* | 5/2007 | Opsasnick | H04L 47/2441 |
| | | | 370/412 |
| 2007/0230493 A1* | 10/2007 | Dravida | H04L 49/9073 |
| | | | 370/412 |
| 2007/0255802 A1 | 11/2007 | Aloni et al. | |
| 2007/0283123 A1 | 12/2007 | Vick et al. | |
| 2008/0031266 A1 | 2/2008 | Tallet et al. | |
| 2008/0043732 A1 | 2/2008 | Desai et al. | |
| 2008/0168194 A1 | 7/2008 | Gregg et al. | |
| 2009/0083392 A1 | 3/2009 | Wong et al. | |
| 2009/0113143 A1 | 4/2009 | Domsch et al. | |
| 2009/0172301 A1 | 7/2009 | Ebersole et al. | |
| 2010/0064070 A1 | 3/2010 | Yoshimura et al. | |
| 2010/0103837 A1* | 4/2010 | Jungck | H04L 63/0227 |
| | | | 370/252 |
| 2010/0161870 A1 | 6/2010 | Daniel | |
| 2010/0232448 A1 | 9/2010 | Sugumar et al. | |
| 2010/0312850 A1 | 12/2010 | Deshpande | |
| 2011/0072204 A1 | 3/2011 | Chang et al. | |
| 2011/0072234 A1 | 3/2011 | Chinya et al. | |
| 2011/0268119 A1* | 11/2011 | Pong | H04L 47/624 |
| | | | 370/392 |
| 2011/0271010 A1 | 11/2011 | Kenchammana et al. | |
| 2012/0166690 A1 | 6/2012 | Regula | |
| 2013/0024591 A1 | 1/2013 | Sun | |
| 2013/0031328 A1 | 1/2013 | Kelleher et al. | |
| 2013/0132536 A1 | 5/2013 | Zhang et al. | |
| 2013/0318322 A1 | 11/2013 | Shetty et al. | |
| 2014/0108726 A1 | 4/2014 | Laurich et al. | |
| 2014/0237156 A1 | 8/2014 | Regula et al. | |
| 2015/0026286 A1 | 1/2015 | Sharp et al. | |
| 2015/0082000 A1 | 3/2015 | Hong et al. | |
| 2015/0089009 A1 | 3/2015 | Tsirkin et al. | |
| 2016/0070475 A1 | 3/2016 | Zhang et al. | |
| 2016/0085450 A1 | 3/2016 | Ahn et al. | |
| 2016/0094553 A1 | 3/2016 | Azgin et al. | |
| 2016/0142317 A1* | 5/2016 | Yang | H04L 47/30 |
| | | | 370/429 |
| 2016/0162422 A1 | 6/2016 | Weber | |
| 2016/0269305 A1 | 9/2016 | Sreeramoju et al. | |
| 2017/0097909 A1 | 4/2017 | Simionescu et al. | |
| 2017/0132148 A1 | 5/2017 | Liu et al. | |
| 2017/0177520 A1 | 6/2017 | Kampe et al. | |
| 2017/0177528 A1 | 6/2017 | Harriman et al. | |
| 2017/0185528 A1 | 6/2017 | Hansson et al. | |
| 2017/0262567 A1* | 9/2017 | Vassiliev | H04L 47/10 |
| 2017/0372088 A1 | 12/2017 | Zhao et al. | |
| 2018/0004703 A1 | 1/2018 | Sharma et al. | |
| 2018/0024938 A1 | 1/2018 | Paltashev et al. | |
| 2018/0046411 A1 | 2/2018 | Coburn et al. | |
| 2018/0052793 A1 | 2/2018 | Fang | |
| 2018/0115498 A1* | 4/2018 | Sundaram | H04L 47/39 |
| 2018/0176134 A1 | 6/2018 | Pignataro et al. | |
| 2018/0191623 A1 | 7/2018 | Marty et al. | |
| 2018/0198715 A1 | 7/2018 | Shmilovici et al. | |
| 2018/0241629 A1 | 8/2018 | Sato et al. | |
| 2018/0359219 A1* | 12/2018 | Israel | H04L 63/0272 |
| 2019/0102310 A1 | 4/2019 | Ramrakhyani et al. | |
| 2019/0109793 A1 | 4/2019 | Dalal | |
| 2019/0116121 A1 | 4/2019 | Friedman et al. | |
| 2019/0141041 A1 | 5/2019 | Bhabbur et al. | |
| 2019/0173810 A1 | 6/2019 | Shpiner et al. | |
| 2019/0188146 A1 | 6/2019 | Dusanapudi et al. | |

(56) References Cited

U.S. PATENT DOCUMENTS

| | | | |
|---|---|---|---|
| 2019/0220425 A1 | 7/2019 | Zemach et al. | |
| 2019/0258415 A1 | 8/2019 | Imamura | |
| 2019/0294366 A1 | 9/2019 | Kawamura et al. | |
| 2019/0305951 A1 | 10/2019 | Grubin et al. | |
| 2019/0320019 A1 | 10/2019 | Hamrick, Jr. | |
| 2019/0324917 A1 | 10/2019 | Cui et al. | |
| 2019/0334828 A1* | 10/2019 | Fairhurst | H04L 49/103 |
| 2019/0370173 A1 | 12/2019 | Boyer et al. | |
| 2019/0379767 A1 | 12/2019 | Sharma et al. | |
| 2019/0384733 A1 | 12/2019 | Jen et al. | |
| 2020/0004685 A1 | 1/2020 | Guim Bernat et al. | |
| 2020/0119753 A1 | 4/2020 | Chirca et al. | |
| 2020/0159669 A1 | 5/2020 | Duncan et al. | |
| 2020/0177513 A1 | 6/2020 | Zhang | |
| 2020/0204489 A1 | 6/2020 | Pianigiani et al. | |
| 2020/0236052 A1 | 7/2020 | Srinivasan et al. | |
| 2020/0264985 A1 | 8/2020 | Lee | |
| 2020/0280518 A1 | 9/2020 | Lee et al. | |
| 2020/0371955 A1 | 11/2020 | Goodacre et al. | |
| 2020/0387405 A1 | 12/2020 | Xiao et al. | |
| 2021/0019069 A1 | 1/2021 | Sen et al. | |
| 2021/0037107 A1 | 2/2021 | Klenk et al. | |
| 2021/0075633 A1 | 3/2021 | Sen et al. | |
| 2021/0083981 A1 | 3/2021 | Shmilovici et al. | |
| 2021/0132999 A1 | 5/2021 | Haywood et al. | |
| 2021/0149803 A1 | 5/2021 | Bernat | |
| 2021/0232312 A1 | 7/2021 | Prasad et al. | |
| 2021/0234706 A1 | 7/2021 | Nair et al. | |
| 2021/0297350 A1 | 9/2021 | Vegesna et al. | |
| 2021/0311643 A1 | 10/2021 | Shanbhogue et al. | |
| 2021/0318961 A1 | 10/2021 | Peterson et al. | |
| 2021/0345112 A1 | 11/2021 | Elliott et al. | |
| 2022/0004512 A1 | 1/2022 | Cannata et al. | |
| 2022/0060422 A1 | 2/2022 | Sommers | |
| 2022/0085916 A1 | 3/2022 | Debbage et al. | |
| 2022/0109587 A1 | 4/2022 | Sapio et al. | |
| 2022/0197787 A1 | 6/2022 | Han et al. | |
| 2022/0200906 A1 | 6/2022 | Ye et al. | |
| 2022/0214912 A1 | 7/2022 | Julien et al. | |
| 2022/0217085 A1 | 7/2022 | Sankar et al. | |
| 2022/0222118 A1 | 7/2022 | Wang et al. | |
| 2022/0248251 A1 | 8/2022 | Ryu et al. | |
| 2022/0283964 A1 | 9/2022 | Burstein et al. | |
| 2022/0291875 A1 | 9/2022 | Diaz-Cuellar et al. | |
| 2022/0394014 A1 | 12/2022 | Wang et al. | |
| 2023/0038094 A1 | 2/2023 | Velasco | |
| 2023/0044342 A1 | 2/2023 | Wilkinson | |
| 2023/0051781 A1 | 2/2023 | Patel et al. | |
| 2023/0093247 A1 | 3/2023 | Kumar et al. | |
| 2023/0096451 A1 | 3/2023 | Johnson et al. | |
| 2024/0028209 A1 | 1/2024 | Berke et al. | |
| 2024/0098023 A1 | 3/2024 | Guo | |
| 2024/0296138 A1 | 9/2024 | Helps et al. | |
| 2024/0311310 A1 | 9/2024 | Fan et al. | |
| 2024/0414087 A1 | 12/2024 | Ranjan et al. | |
| 2024/0422100 A1 | 12/2024 | Helps et al. | |

FOREIGN PATENT DOCUMENTS

| | | | | |
|---|---|---|---|---|
| EP | 3504849 B1 * | 3/2022 | | H04L 47/29 |
| WO | WO-2005106693 A2 | 11/2005 | | |
| WO | WO-2009120798 A2 | 10/2009 | | |
| WO | WO-2020055921 A1 | 3/2020 | | |
| WO | WO-2022/005322 A1 | 1/2022 | | |
| WO | WO-2022108498 A1 | 5/2022 | | |
| WO | WO-2022198552 | 9/2022 | | |
| WO | WO-2024102915 A1 | 5/2024 | | |

OTHER PUBLICATIONS

U.S. Appl. No. 18/778,611, filed Jul. 19, 2024, Server Fabric Adapter for I/O Scaling of Heterogeneous and Accelerated Compute Systems, Rochan Sankar, et al.

U.S. Appl. No. 18/747,118, filed Jun. 18, 2024, Optimally Balanced Network Systems, Rochan Sankar, et al.

U.S. Appl. No. 19/037,768, filed Jan. 27, 2025, Server Fabric Adapter for I/O Scaling of Heterogeneous and Accelerated Compute Systems, Rochan Sankar, et al.

U.S. Appl. No. 17/836,532, filed Jun. 9, 2022, Transparent Remote Memory Access Over Network Protocol, Thomas Norrie, et al.

U.S. Appl. No. 18/755,372, filed 6/26/224, Transparent Remote Memory Access Over Network Protocol, Thomas Norrie, et al.

U.S. Appl. No. 17/886,026, filed Aug. 11, 2022, System And Method For Congestion Control Using A Flow Level Transmit Mechanism, Shrijeet Mukherjee et al.

U.S. Appl. No. 18/102,033, filed Jan. 26, 2023, System And Method For One-Sided Read Rma Using Linked Queues, Shrijeet Mukerjee, et al.

U.S. Appl. No. 18/447,180, filed Aug. 9, 2023, System And Method For Ghost Bridging, Thomas Norrie, et al.

U.S. Appl. No. 18/666,548, filed May 16, 2024, System And Method For An Optimized Staging Buffer For Broadcast/Multicast Operations, Shrijeet Mukherjee, et al.

U.S. Appl. No. 18/526,727, filed Dec. 1, 2023, A Modular Datacenter Interconnection System, David Skirmont, et al.

U.S. Appl. No. 18/785,542, filed Jul. 26, 2024, Method And System For Tracking And Moving Pages Within A Memory Hierarchy, Shrijeet Mukhrjee, et al.

U.S. Appl. No. 18/920,558, filed Oct. 18, 2024, System and Method for Optimally Balanced Network Multipathing, Shrijeet Mukhrjee, et al.

U.S. Appl. No. 19/034,371, filed Jan. 22, 2025, Input/Output System Interconnect Redundancy and Failover, Frederic Vecoven, et al.

U.S. Appl. No. 18/785,542, filed Jul. 26, 2024, System and Method for Optimally Balanced Network Multipathing, Shrijeet Mukhrjee, et al.

Rochan, Sankar, Foundational Fabrics for AI: Introducing the Accelerated Compute Fabric Switch, AI Hardware Summit, Sep. 13, 2023.

International Search Report and Written Opinion for International Patent Application No. PCT/US2024/052073, dated Apr. 28, 2024 (15 pages).

Emulex Corporation. "Emulex provides 10Gb Ethernet Virtual Fabric Adapter 5 for New Lenovo Servers." Business Wire. Dec. 15, 2014 (Dec. 15, 2014) Retrieved on Mar. 7, 2022 (Mar. 7, 2022 from: <https://www.businesswire.com/news/home/20141215005718/en/ Emulex-provides-10Gb-Ethernet-Virtual-Fabric-Adapter-5-New-Lenovo-Ervers>entire document.

International Search Report and Written Opinion for International Patent Application No. PCT/US2022/011491, dated Mar. 24, 2022 (8 pages).

International Search Report and Written Opinion for International Patent Application No. PCT/US2022/32841, dated Nov. 21, 2022 (10 pages).

International Search Report and Written Opinion for International Patent Application No. PCT/US2022/74833, dated Dec. 6, 2022 (8 pages).

International Search Report and Written Opinion for International Patent Application No. PCT/US2023/062168, dated May 12, 2023 (54 pages).

International Search Report and Written Opinion for International Patent Application No. PCT/US2023/61405, dated Jul. 11, 2023 (6 pages).

International Search Report and Written Opinion for International Patent Application No. PCT/US2023/082132, dated Jun. 6, 2024 (8 pages).

International Search Report and Written Opinion for International Patent Application No. PCT/US2024/029723, dated Aug. 22, 2024 (14 pages).

International Search Report and Written Opinion for International Patent Application No. PCT/US2023/029887, dated Oct. 26, 2023 (13 pages).

"Using Non-transparent Bridging in PCI Express Systems," by Jack Regula, Jun. 1, 2004, Jun. 1, 2004, pp. 4-30, XP002686987, URL:http :/ /www.plxtech.com/files/pdf/technical/expresslane/ NontransparentBridging .pdf.

(56) References Cited

OTHER PUBLICATIONS

International Search Report and Written Opinion for International Patent Application No. PCT/US2024/039765, dated Oct. 22, 2024 (15 pages).

European Search Report for European Patent Application No. EP 22737124.2, dated Jan. 23, 2025 (12 pages).

Extended European Search Report for European Patent Application No. EP 22856810.1, dated May 30, 2025 (9 pages).

International Search Report and Written Opinion for International Patent Application No. PCT/US2025/012514, dated Jul. 30, 2025 (11 pages).

Partial European Search Report for European Patent Application No. EP 22821030.8, dated Apr. 9, 2025 (20 pages).

* cited by examiner

1100 ⎯

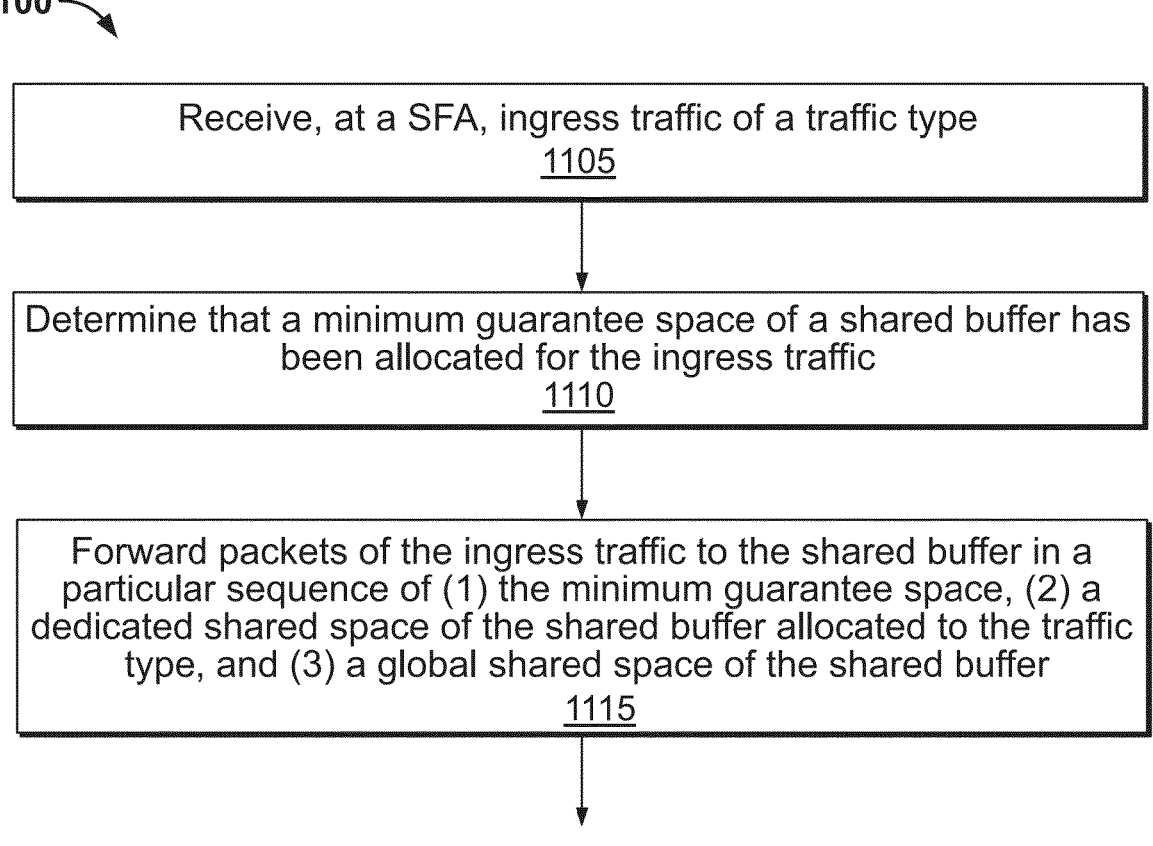

Receive, at a SFA, ingress traffic of a traffic type
1105

Determine that a minimum guarantee space of a shared buffer has been allocated for the ingress traffic
1110

Forward packets of the ingress traffic to the shared buffer in a particular sequence of (1) the minimum guarantee space, (2) a dedicated shared space of the shared buffer allocated to the traffic type, and (3) a global shared space of the shared buffer
1115

Figure 11

SYSTEM AND METHOD FOR USING DYNAMIC THRESHOLDS WITH ROUTE ISOLATION FOR HETEROGENEOUS TRAFFIC IN SHARED MEMORY PACKET BUFFERS

CROSS REFERENCE TO RELATED APPLICATION

This application claims the benefit of priority to U.S. Provisional Patent Application No. 63/307,952, filed Feb. 8, 2022, the entire contents of which are incorporated by reference herein.

TECHNICAL FIELD

This disclosure relates to admission control on shared memory packet buffers to provide fair access and reduce memory wastage based on dynamic thresholds with route isolation.

BACKGROUND

Modeling dynamics of heterogeneous traffic flow is central to the control and operations of today's increasingly complex network transmission systems. A heterogeneous network is a network connecting computers and other devices that have significantly different operating systems and protocols. The heterogenous networks are multiservice, providing more than one distinct application or service traffic. Studies have shown that heterogeneous network traffic transmission by its nature is very bursty, that is, often having unexpected or sudden network traffic volume peaks. Currently, resources are optimized for average utilization, and so, on average the network fabric utilization is reasonable. However, when aggregating numerous flows of burstiness nature, the current network fabrics may experience severe, albeit temporary, congestion. This may lead to unnecessary packet loss due to buffer overflows in switches. As a result, the overall usable throughput may be reduced, and/or the end-to-end latency may be increased, thereby significantly affecting application performance.

Since existing solutions that deal with fabric congestion have some shortcomings, it is critical and imperative to build systems and processes to implement dynamic capacity orchestration, to understand network needs and plan for bursts, such that network bandwidth congestion and service disruptions can be reduced or eliminated.

SUMMARY

To address the aforementioned shortcomings, a system for managing shared memory packet buffers is disclosed. In some embodiments, the system is configured to receive and classify a packet as one of: network-network, network-host, host-network, or host-host; select a minimum guarantee space for the packet according to the classification thereof; if the selected minimum guarantee space is available, store the packet therein; otherwise, if a dedicated shared space is available, store the packet therein; otherwise, if a global shared space is available, store the packet therein; and otherwise, drop the packet.

In other embodiments, the system is configured to receive ingress traffic of a traffic type at a server fabric adapter (SFA) communicatively coupled to an ingress entity; determine, by the SFA, whether a minimum guarantee space of a shared buffer has been allocated for the ingress traffic, and in response to determining the minimum guarantee space has been allocated for the ingress traffic, forward packets of the ingress traffic to the shared buffer in a particular sequence of (1) the minimum guarantee space, (2) a dedicated shared space of the shared buffer allocated to the traffic type, and (3) a global shared space of the shared buffer.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

FIG. 11 illustrates an exemplary process of managing shared memory packet buffers from ingress view, according to some embodiments.

DETAILED DESCRIPTION

Figure 1:
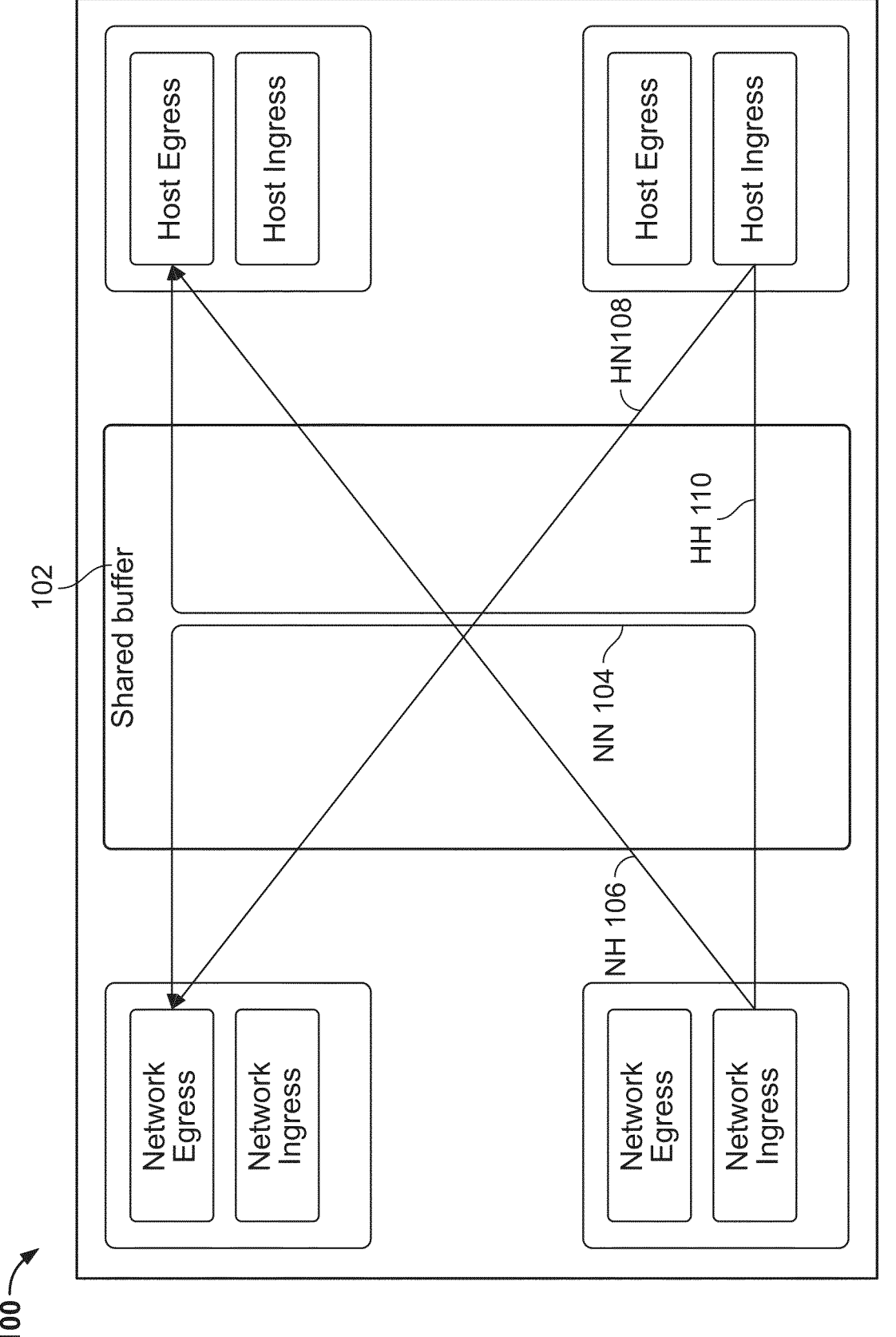
FIG. 1 illustrates a block diagram of example traffic types handled by the present system, according to some embodiments.

The Figures (Figs.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

This present disclosure provides a system and method for using dynamic thresholds with route isolation for heterogeneous traffic in shared memory packet buffers. While heterogeneous networks have attracted widespread attention in the field of wire/wireless communications, providing performance guarantees in such networks may be challenging due to the bursty nature of network traffic, e.g., variable bit rate traffic streams. To guarantee quality network performance, e.g., an end-to-end delay of a given traffic stream, sufficient network resources may need to be allocated. In addition, an admission control scheme may also be needed to ensure that the resource requirements of a new traffic stream can be accommodated without compromising the resource requirements of the existing traffic streams in the network. However, over-allocation of network resources to provide performance guarantees can lead to substantially poor network utilization. One approach to address this issue is to characterize the network traffic by sophisticated stochastic models and to derive end-to-end network performance metrics based on such models. But the characterization of the bursty network traffic is intrinsically difficult and may give rise to other problems such as heavy-tailed queue distributions within the network.

To deal with the heterogenous traffic, especially fabric congestion associated with the heterogenous traffic, existing solutions include either over-allocating network resources, e.g., over-provisioning bandwidth in a network for the worst scenario, or providing generous buffering that is shared by all data flows. The former is cost-driven and can quickly become intolerantly expensive. The latter is also deficient in certain aspects, as described below.

Shared memory packet buffers require admission control to provide fair access to all data flows while minimizing wastage of the shared memory. The typical admission control or buffer management policies that have been used in the existing communication systems include: completely partitioned (CP), completely shared (CS), dynamic algorithm (DA), and dynamic algorithm with dynamic thresholds (DADT).

In a completely partitioned (CP) communication system, a buffer is statically partitioned among sources. That is, an entire buffer space is permanently divided among different data flows, and each flow can only use its assigned share. The CP admission control prevents different flows from affecting each other, but may not make full use of the entire buffer. In other words, CP has a major downside of low utilization of the buffer because of the statistically time multiplexed network traffic associated with the statically partitioned packet buffer. The low buffer utilization may further cause tail drops on active flows (while buffers for inactive flows may often be empty). With tail drops, when a queue is filled to its maximum capacity, the newly arriving packets will be dropped until the queue has enough room to accept incoming traffic. Another major issue of statically partitioning a buffer with CP buffer management is that a large number of buffers will be required to achieve meaningful performance when there is a large number of queues that represent a classified source of packets, which may result in prohibitive cost.

In a completely shared (CS) communication system, the incoming packets of all the data flows are assigned to the same buffer, and a new packet can be accepted as long as there is space in this common or shared buffer. Because the queues of CS do not have an individual limit and an incoming packet can be admitted when there is space in the memory, CS generally enables more efficient buffer usage than CP but cannot provide isolation between various data flows. In some cases, even with CS, greedy flows may occupy a large percentage of the shared buffer, resulting in tail drops for other flows.

When a dynamic algorithm (DA) is used, network packets are admitted based on a threshold. This threshold is usually a single, dynamically-changed threshold. For example, the single threshold may change dynamically based on available space and a constant $\alpha$. The constant $\alpha$ is applied on the available space to calculate the admission threshold, for example, threshold=$\alpha \times$available space.

Here, the single constant $\alpha$ can be a configurable constant, typically ranging from $1/64$ to 64. The single threshold produced from a single a and a shared buffer may work well for data flows that are identical in packet sizes, of equal priority, and identical rates. However, when one of the parameters (e.g., sizes, priority, rates) varies, new packet drops or tail drops may occur even if a packet buffer is not fully filled (e.g., under-utilized).

Due to the deficiencies of CP, CS, and DA (e.g., packet or tail drops), dynamic algorithm with dynamic thresholds (DADT) has been developed. In a DADT communication system, network packets are admitted based on individual thresholds that change dynamically based on the available space and their own constant $\alpha$. The DADT admission control scheme may be sufficient when data flows utilize packet buffers in homogeneous networks. For example, the packet loss ratio may be reduced by DADT using different threshold values for different queues. However, when a shared homogeneous packet buffer is presented with traffic flowing in a heterogeneous network, the dynamic nature of the traffic of these flows can cause starvation or deadlock. The traffic flows of the heterogeneous network can be a) Network to Host, b) Host to Network c) Host to Host d) intra-die (e.g., intra-chip) preliminary packets, in addition to the traditional e) Network to Network traffic. Using existing DADT admission control mechanisms, a packet buffer cannot be shared among these sources (e.g., host, network) or be partitioned logically at boot time.

Specifically, DADT falls short when dealing with multiple protocols and disparate patterns such as mixing ethernet traffic with PCIe transport layer protocols (TLPs), intra-die management packets, etc. It is of high risk that a packet buffer will be filled up by some of the flows while starving others when a simple DADT is used, even if such DADT works for statistically homogeneous traffic with high utilization of the shared memory packet buffer. Currently, one way to deal with such a traffic mix is to carve up the buffer into various pools and apply DADT on those pools. But partitioning the buffer may result in stranded resources, defeating the purpose of a shared buffer. Another way is to provide minimum guaranteed reservation to each source. But the minimum guaranteed reservation can be expensive when the number of queues are in the tens-of-thousands.

The present methods and systems allow for highly efficient shared buffer implementation in the presence of heterogeneous sources of traffic with independent flow characteristics. To overcome the aforementioned technical issues, the present systems and methods provide route isolation for heterogeneous flows through a minimum shared reservation pool of a packet buffer per type of flow, while maintaining most of the packet buffer as a globally shared entity.

In some embodiments, the present approach supports a two-tier admission control scheme. At the first tier, each type of traffic flow may be allocated a guaranteed configurable minimum of buffer space (e.g., 210 in FIG. 2). This is the memory space that this traffic flow consumes first. If more buffer space is needed, the traffic flow may seek the extra space from the second tier. At the second tier, each type of traffic flow may be configured to compete for the shared buffer space using DADT. The shared buffer space is the space that has not been consumed by the sum of minimum space assigned to each type of traffic flow, e.g., shared buffer space 204 in FIG. 2 below. In some embodiments, the present approach allows all the buffering to be carved out of a single shared buffer through configuration.

FIG. 1 illustrates a block diagram 100 of example traffic types that may be handled by the present system. Buffers are often used in conjunction with hardware (e.g., network interfaces) to send or receive data to or from networks or hosts. As depicted in FIG. 1, the buffer scheduling and management system described herein may reserve an amount of buffer (e.g., shared buffer 102) to be shared among various data flows. There are four types of traffic that may transmit through the shared buffer 102.

1. NN: network ingress (NI) to network egress (NE);
2. NH: network ingress (NI) to host egress (HE);
3. HN: host ingress (HI) to network egress (NE);
4. HH: host Ingress (HI) to host egress (HE).

These traffic types are respectively shown in FIG. 1 as NN 104, NH 106, HN 108, and HH 110. Ingress indicates the traffic that enters an entity (e.g., host, server) or a boundary of a network, while egress indicates the traffic that exits the entity or network boundary. For example, NH 106 shows the data flow that comes from network ingress towards shared buffer 102 and reaches a host through host egress.

Admission Control

Admission control in switched network transmission is enforced primarily on a fully shared buffer memory to provide isolation and fairness to all types of traffic. For example, if a host egress stops working and there is no appropriate admission control, all packets going to that host egress will occupy all the shared buffer space, and any other packets will not be able to find any space in the shared buffer, which will lead to the spill/overflow of the entire shared buffer. Therefore, the buffer needs to be fairly allocated among the sources and priorities.

Figure 2:
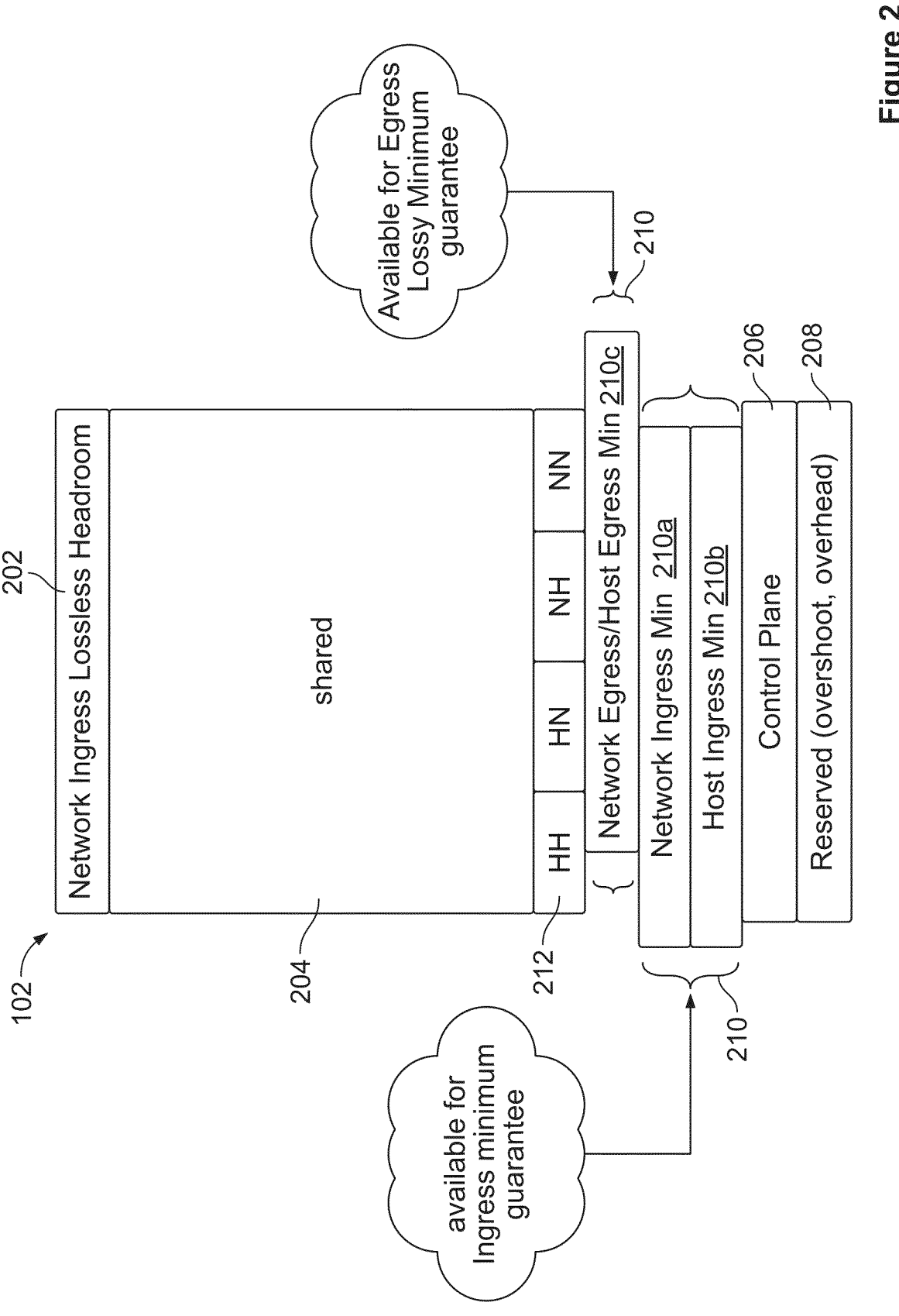
FIG. 2 illustrates an example buffer structure of a shared buffer, according to some embodiments.

FIG. 2 illustrates an exemplary buffer structure of a shared buffer, according to some embodiments. The shared buffer, e.g., buffer 102 in FIG. 1, is internally broken into various elements shown in FIG. 2. When a packet falling into one of the four types/categories (e.g., NN, NH, HN, HH) enters into a particular ingress, the structure as shown in FIG. 2 can ensure that there is a space to buffer/keep the packet. When a packet is going towards a particular egress, the elements in FIG. 2 can ensure that there is a buffer space from which the packet leaves. As depicted, the shared buffer 102 may include a network ingress lossless headroom 202, shared space 204, control plane space 206, reserved space 208, and minimum guarantee space 210. In some embodiments, control plane space 206 refer to the management region of reserved storage.

The minimum guarantee space 210 includes a minimum guarantee space for data ingress (hereafter "ingress min") and a minimum guarantee space for lossy data egress (hereafter "egress min"). The ingress min can be a network ingress min 210*a* and host ingress min 210*b*. The egress min can be a network egress/host egress min 210*c*. The exemplary buffer structure of shared buffer 102 in FIG. 2 may also include a dedicated buffer space 212 for each of the HH, HN, NH, and NN traffic types. The dedicated buffer space is configured to associate with a particular type of traffic and be available to that type of traffic only.

Lossless network ingress traffic has an expectation that the packets will not be dropped. In some embodiments, a receiving packet buffer may provide per priority flow control (PFC) that is triggered based on the occupancy of corresponding priority queues. The shared headroom 204 is provided to absorb any inflight packets, i.e., the packets that have not yet been handled by the receiving packet buffer. That is, headroom 204 is used as a buffer space for packets received while a pause is asserted. When PFC is configured on priorities on an ingress port, the ingress port may send a pause message to a connected peer to indicate that its buffer is going to overflow and no more packets can be taken. Some packets, however, has been sent out when the connected peer receives this pause message and pauses the data transmission. Shared headroom 204 buffers and stores such packets that arrive between the time the ingress port sends the pause message and the time the last packet arrives after the connecting peer pauses traffic. On the other hand, if the network ingress traffic is lossy, one or more packets may be dropped based on the receive buffer occupancy.

Figure 3:
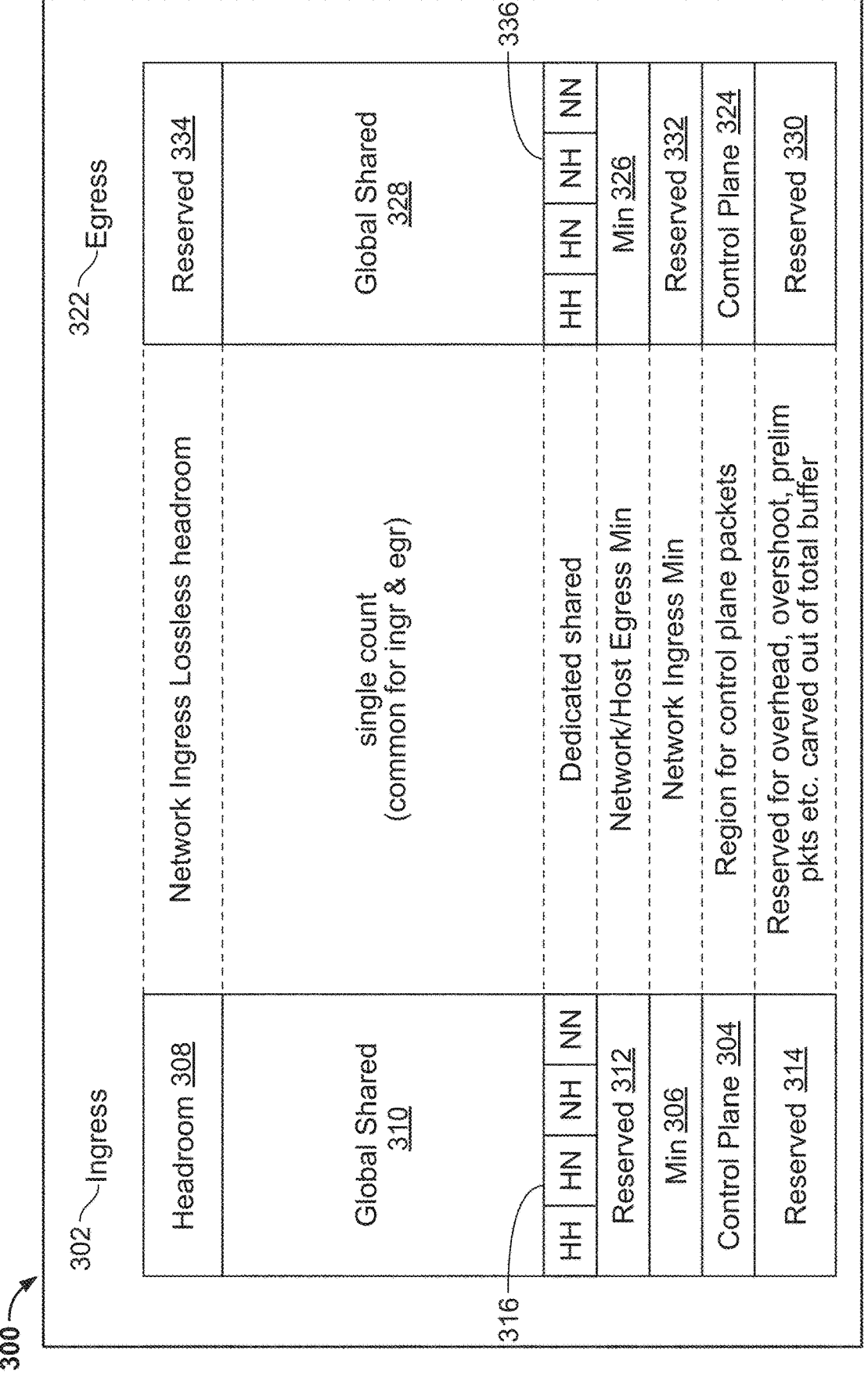
FIG. 3 illustrates an example ingress view and egress view of a buffer memory, according to some embodiments.

FIG. 3 illustrates an ingress and egress view 300 of a buffer memory, e.g., shared buffer 102 in FIGS. 1 and 2. From the left to the right of FIG. 3, an ingress view 302 of the buffer memory and an egress view 322 of the buffer memory are shown.

Ingress View of Buffer Memory

The ingress view 302 is used for admission control based on the ingress, i.e., data entering into the buffer memory from networks/hosts. From the perspective of ingress, in shared buffer 102, a buffer space for management CPU (e.g., space for control plane packets 304), a minimum amount of buffer space for ingress (e.g., minimum guarantee space region 306), and a headroom 308 are configured, and a large chunk of shared buffer space for all types of traffic (e.g., global shared space 310) and dedicated space (e.g., 316) for each type of traffic are allocated. The rest of the shared buffer 102 is temporarily reserved or unused, e.g., reserved regions 312, 314.

In some embodiments, management region for control plane packets 304 may be reserved for the management traffic going to networks/hosts. This region will guarantee the minimum buffer space reservation to the management traffic. In some embodiments, this minimum reservation can be set to zero. Once the minimum reservation is exhausted, the management traffic will consume the space from global shared region 310. The admission control will use a dynamic threshold with its own constant α to backpressure the traffic.

Minimum guarantee space region 306 (or min 306) may be used as a host ingress (HI) min and a network ingress (NI) min. When taken as a HI min, this region is dedicated for the traffic type HI and used as a host minimum reservation for buffer space. In some embodiments, this reservation is guaranteed on a per host source port basis. When used as a NI min, this region is dedicated for the minimum buffer space reservation for any lossless or lossy network ingress classes of service (COS).

Headroom 308 is a region that is dedicated to absorb the in-flight lossless network ingress packets after PFC has been triggered, that is, storing the packets that arrive between the time the ingress sends a pause message and the time the last packet arrives at the ingress after the traffic is paused.

Global shared region 310 is fully shared by all of the ingress entities (e.g., hosts, servers). The share of global region 310 that is available to each entity may be controlled by the constant α corresponding to each entity. In some embodiments, the available storage of global shared region 310 is decremented only once at ingress check, which is described below with reference to FIGS. 8A-8D. As a result, the same available amount of storage may be visible to the egress entities for all accounting purposes.

In some embodiments, the reserved region (e.g., 312, 314) may not be configured for data ingress, and therefore is not available for ingress accounting. This region, however, may be configured to be used by the egress side, for example, there is a corresponding dedicated region on the egress.

Egress View of Buffer Memory

The egress view 322 in FIG. 3 is used for admission control based on egress entities. The egress entities can be ports, queues, host interfaces, etc. From the perspective of egress and in the presence of network lossless and lossy traffic, regarding shared buffer 102, a buffer space for management CPU (e.g., space for control plane packets 324) and a minimum amount of buffer space for egress (e.g., minimum guarantee space region or min 326) may be configured, and a large chunk of shared buffer space for all types of traffic (e.g., global shared space 328) and dedicated space (e.g., 316) for each type of traffic may be allocated. The rest of the shared buffer 102 are reserved, e.g., reserved regions 330, 332, and 334.

As described above, management region for control plane packets 324 may be configured to guarantee a minimum space for network and host management traffic.

Minimum guarantee space region or min 326 is designed or dedicated (e.g., per port/host) for the minimum reservation for any lossy traffic. In some embodiments, this region may be a network egress min and/or host egress min. The min region 326 is needed to ensure that lossless traffic would not cause all the lossy traffic to be dropped. An admission decision for lossless traffic by the ingress side is final, which means that the egress cannot drop the packets of the lossless traffic. Egress entities that receive both lossy and lossless traffic must count both types of traffic to ensure that the congestion is fully accounted for. This, however, may result in all the lossy traffic to be dropped. In order to guarantee forward progress of the lossy traffic, as depicted in FIG. 3, a minimum reservation (e.g., region 330) may be carved out for the desired egress entities.

Global shared region 328 is fully shared by all of the ingress entities (e.g., hosts, servers). The share of global region 328 that is available to each entity may be controlled by the constant α corresponding to each entity.

In some embodiments, the first reserved region 330 may be carved out of the buffer memory for architectural and micro-architectural overhead, such as overshoot (occurrence of packets exceeding a target value), preliminary packets, etc.

The second reserved region 328 is not available for or used by egress accounting. This is the region for guaranteeing minimum buffer space for host ingress (HI) and network ingress (NI) traffic, and there is a corresponding dedicated region (e.g. minimum guarantee space region 306) on the ingress.

The reserved region 334 is another region that is not available to egress accounting although it is used as a headroom from the view of ingress. In response to a pause command, the ingress side needs to absorb the packets that had already been transmitted, while the egress side merely pauses the packet transmission without needing to absorb any packets (and thus do not need a headroom).

Buffer Isolation for Different Traffic Types in SFA

While dynamic thresholds in a fully shared buffer provides an efficient and cost-effective implementation of packet buffers, the presence of different types of flows in a switch core may cause unfair consumption of the buffer memory, resulting in starvation for some traffic types. In order to provide isolation among these flows, four dedicated shared regions are carved out of the global shared region, e.g., 212, 316, 336 as shown FIGS. 2 and 3.

In some embodiments, the amount of available buffer and thresholds can be calculated as follows. For example, the buffer space available to any traffic that goes from NI to NE (e.g., traffic type NN 104) and requires shared storage may be calculated as:

$$\text{Available buffer}_{NN} = \text{Global shared available} + \text{Dedicated shared available}_{NN}$$

In view of FIGS. 2 and 3, the "dedicated shared available" may be the buffer space of 212, 316, or 336 that is only available to the traffic type NN. The "global shared available" may be global shared space 204, 310, or 328. In some embodiments, a dynamic threshold for an entity i that belongs to the traffic type NN may be calculated as:

$$\text{Threshold}_{i;NN} = \alpha_i * \text{Available buffer}_{NN}$$

Here, the entity i can be a class of service (COS), a queue, a port, a host interface, etc. The constant $\alpha_i$ can be 0, $\frac{1}{128}$, $\frac{1}{64}$, $\frac{1}{32}$, $\frac{1}{16}$, $\frac{1}{8}$, $\frac{1}{4}$, $\frac{1}{2}$, 1, 2, 4, 8, 16, 32, 64, . . . . There is no upper limit for the constant $\alpha_i$.

In some embodiments, when the occupancy of shared buffer from an entity goes beyond its dynamic threshold, that is, $\text{Occupancy}_{i;NN} > \text{Threshold}_{i;NN}$, one of two actions may take place. Packets that do not have a guarantee against loss may be dropped. For example, the packets of lossy traffic that are not allocated a minimum guarantee space will be discarded, as shown below in FIG. 5. For the remaining packets, flow control or PFC may be triggered to the source to reduce the data transmission rate.

Lossless+Lossy Configuration

Figure 4:
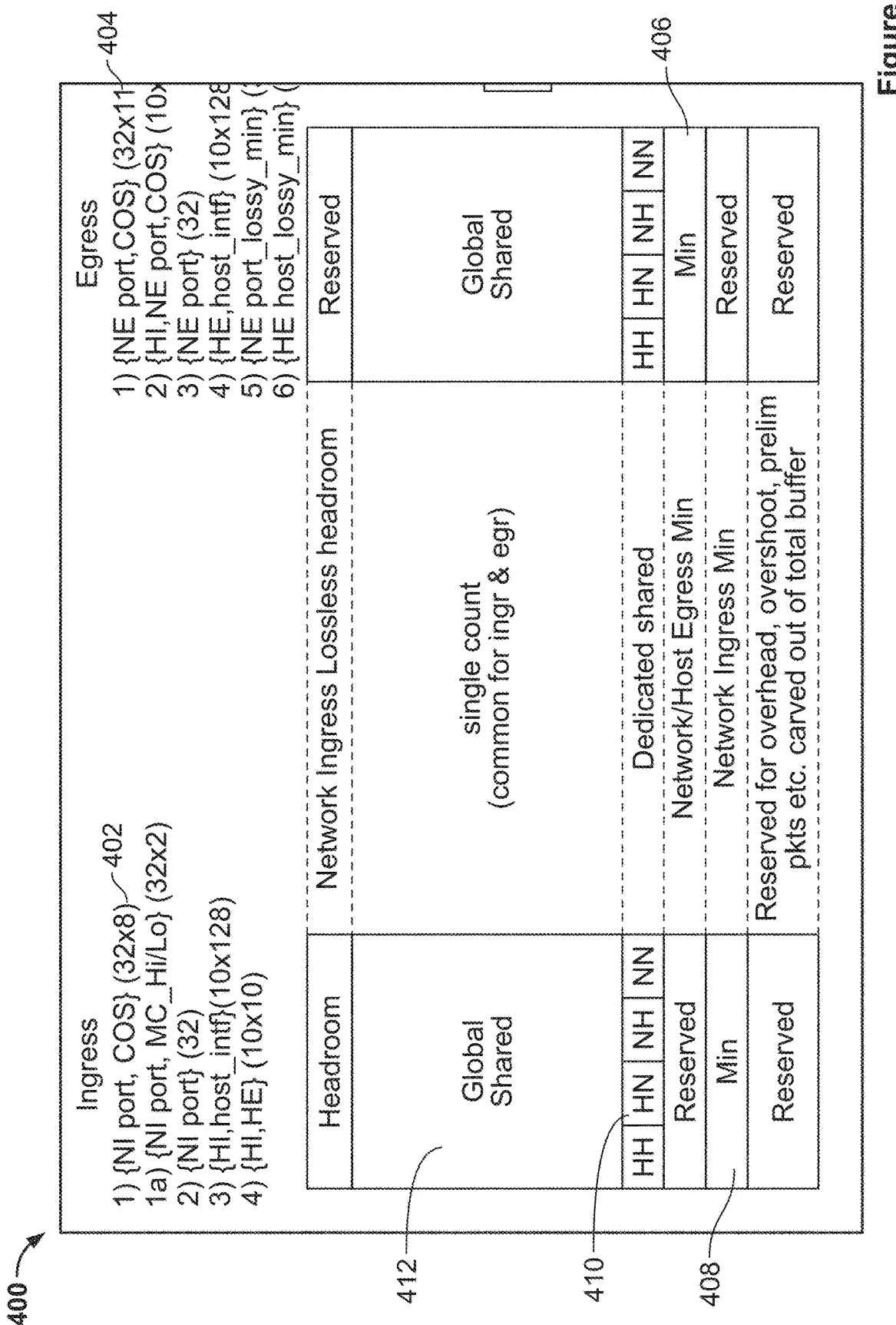
FIG. 4 illustrates an example shared buffer configuration that supports a mix of lossy and lossless traffic, according to some embodiments.

FIG. 4 illustrates a shared buffer configuration 400 that supports a mix of traffic types (e.g., lossy and lossless). Generally, when data flows of the mixed traffic types arrive from various ingress sources (e.g., network ports and/or hosts) and priority-based flow control is applied, a shared buffer (e.g., shared buffer 102 of FIG. 1) may be configured to show buffer regions and counters in FIG. 4.

In some embodiments, in order to accomplish the desired admission policies, the shared buffer may be configured to maintain a variety of counters at both ingress and egress. These counters (e.g., 402, 404) may provide the necessary statistics for estimating the amount of bytes (or their equivalents) that are stored on and/or retrieved from the shared buffer. For example, these counters may count the number of bytes that arrive at an ingress port or departed from an egress port, the number of bytes that arrive for a given class of service (COS); arrived or departed bytes from or to a given host, etc.

In the example of FIG. 4, the shared buffer is configured to reserve a certain amount of buffering per network ingress port, regardless of the destination of a packet. That is, this destination can be another network port or a host interface. A minimal amount of buffering (e.g., 406) is also reserved for each egress port to provide the ability to support lossless operation without impeding lossy traffic, as described above.

Once the shared buffer is configured as shown in FIG. 4, during a normal operation, a traffic source entity will use the shared buffer resources in ingress side according to the following order:

1. First, using the minimum guarantee space region (e.g., network ingress min 408) for a packet entering the network through network ingress;
2. Next, depending on the source and destination of the packet, using the dedicated shared buffer space (e.g., dedicated shared 410) for HH, HN, NH, NN;
3. Last, competing for the global shared pool (e.g., global shared 412).

In this way, even if a host egress is jammed to cause all the global shared space to be used up, this may not affect or drop a lossless packet since the packet is first placed and stored in the network ingress min 408 and the buffering of the packet is at least guaranteed by this minimum guarantee space. In some embodiments, when the minimum guarantee space starts filling up, PFC will cause the sender to stop sending more data, which is especially useful for lossless traffic. If this packet is passing through to the network egress, its buffering may be further protected by its dedicated space because this dedicated space is not used for packets to host egress and will not be filled up because of the jammed host egress.

Lossy Only Network Configuration

Figure 5:
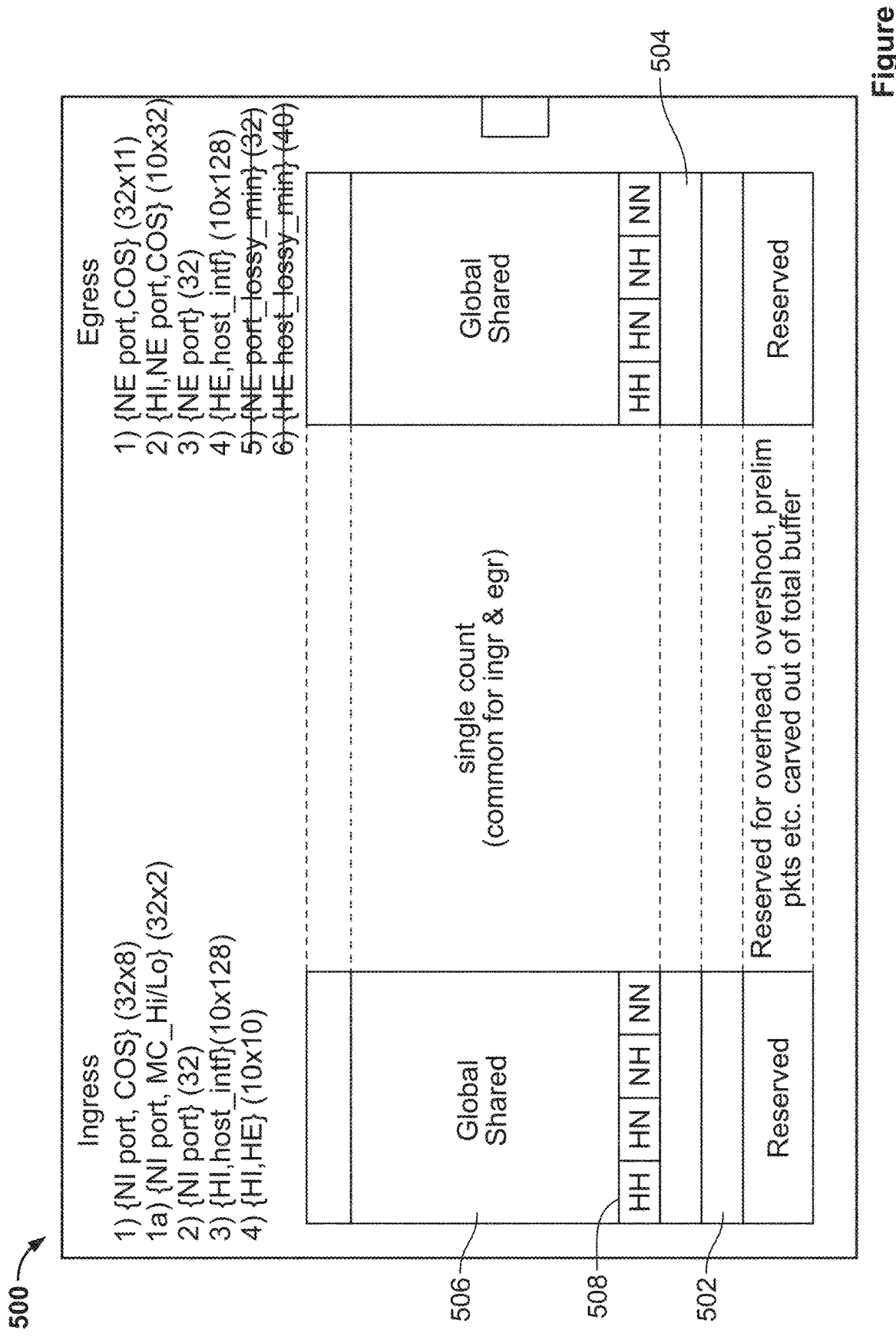
FIG. 5 illustrates an example shared buffer configuration that supports lossy traffic, according to some embodiments.

FIG. 5 illustrates a shared buffer configuration 500 that supports lossy traffic. The example of FIG. 5 shows a configuration slightly different from that in FIG. 4, but all the traffic classes in the network supported by the buffer configuration in FIG. 5 are considered to be lossy. In the scenario of lossy traffic, it may not be necessary to have a certain amount of buffering reserved per network ingress port, although it can still be useful (as described below in FIG. 6). Therefore, from the ingress view, buffer space 502 is no longer configured to be a minimum guarantee space region 408 as in FIG. 4. Also, because dropping packets is permittable (i.e., lossy traffic), there is no need for egress buffering. Therefore, buffer space 504 is also not configured to be a minimum guarantee space region 406 as in FIG. 4. Instead, these memory regions are returned to the pool of global shared space 506. When a data packet enters into an ingress port, it may use the shared buffer following the sequence of (1) using dedicated shared buffer space 508 (depending on the source and destination of the packet), and (2) then using global shared space 506.

Lossy Only Network Configuration with Ingress Minimum Guarantee

Figure 6:
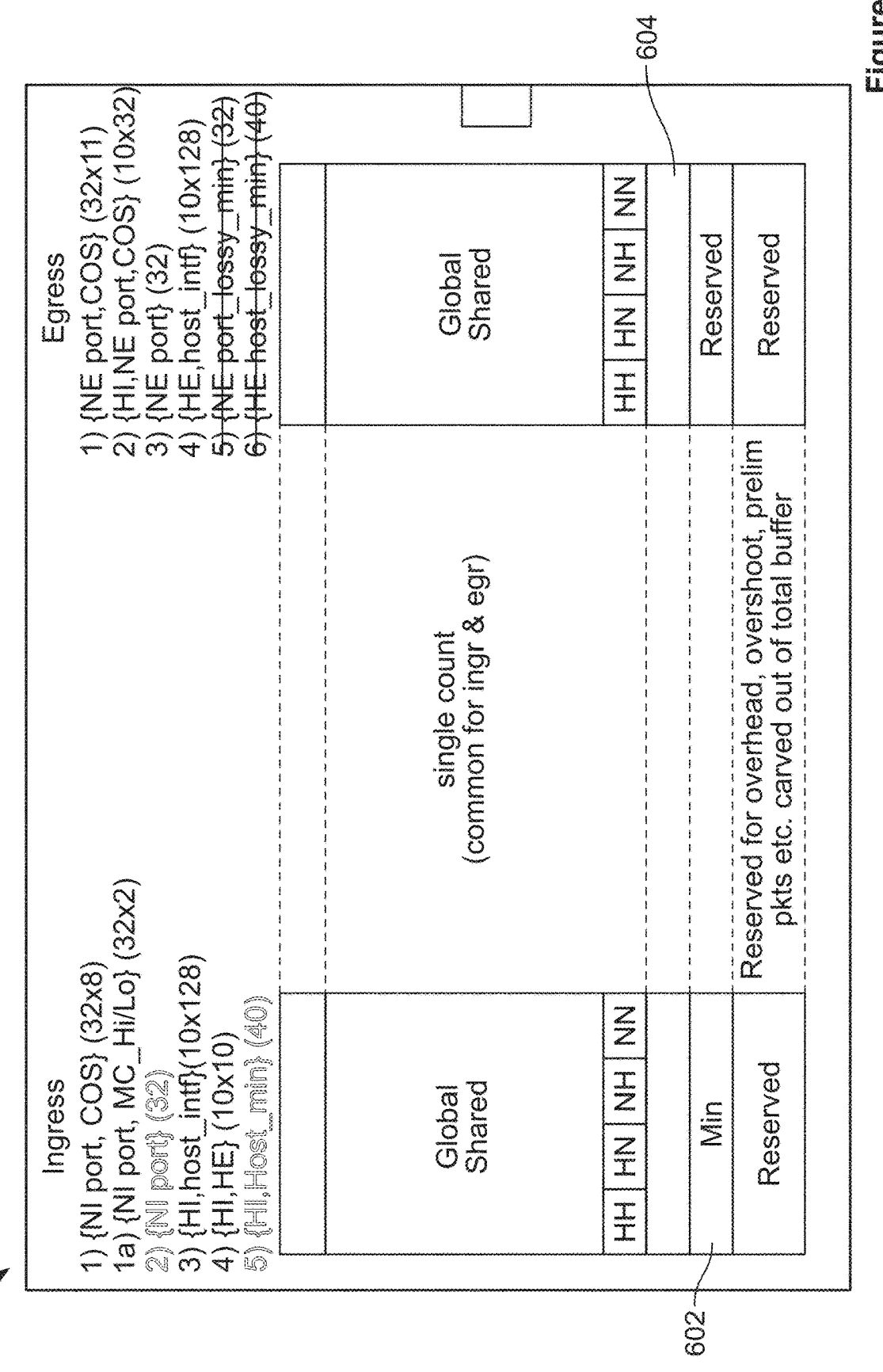
FIG. 6 illustrates an example shared buffer configuration associated with providing a minimum guaranteed isolation among ingress entities, according to some embodiments.

FIG. 6 illustrates a shared buffer configuration 600 (e.g., buffer regions and counters) associated with providing a minimum guaranteed isolation among ingress entities, according to some embodiments. The ingress entities can be ingress network ports and ingress hosts. The example of FIG. 6 shows a typical case whereby a nominal amount of buffering (e.g., min 602) is always reserved for each ingress entity (e.g., network or host), even when all the traffic belongs to lossy classes of service (COS). Because this configuration is used to support lossy traffic as in FIG. 5, egress buffering is not needed, and buffer space 604 is not configured as a minimum guarantee space region 406 shown in FIG. 4. The operations and the shared buffer usage models in the example of FIG. 6 are similar to those described above in FIG. 4, and will not be repeated herein for clarity and simplicity.

Hysteresis & Resume Offset

The traffic that occupies a shared buffer through a network ingress may be NN and/or NH. For a host ingress, the traffic that occupies the shared buffer may be HN and/or HH. As described above, when the occupancy of the shared buffer for a given ingress entity i exceeds its dynamic threshold, that is, $\text{Occupancy}_i > \text{Threshold}_i$, action is taken to bring this entity's buffer occupancy back into compliance. This can result in packet drops (e.g., for lossy classes of service) or triggering PFC flow control (e.g., for lossless COS). In some embodiments, when the shared buffer occupancy for the ingress entity i falls below the $\text{Threshold}_i$, the action will not be terminated immediately. Instead, this action continues until the occupancy reaches a level of $\text{Threshold}_i\text{--C}$. Here C is a constant that can be programmed for a given shared buffer.

Figure 7:
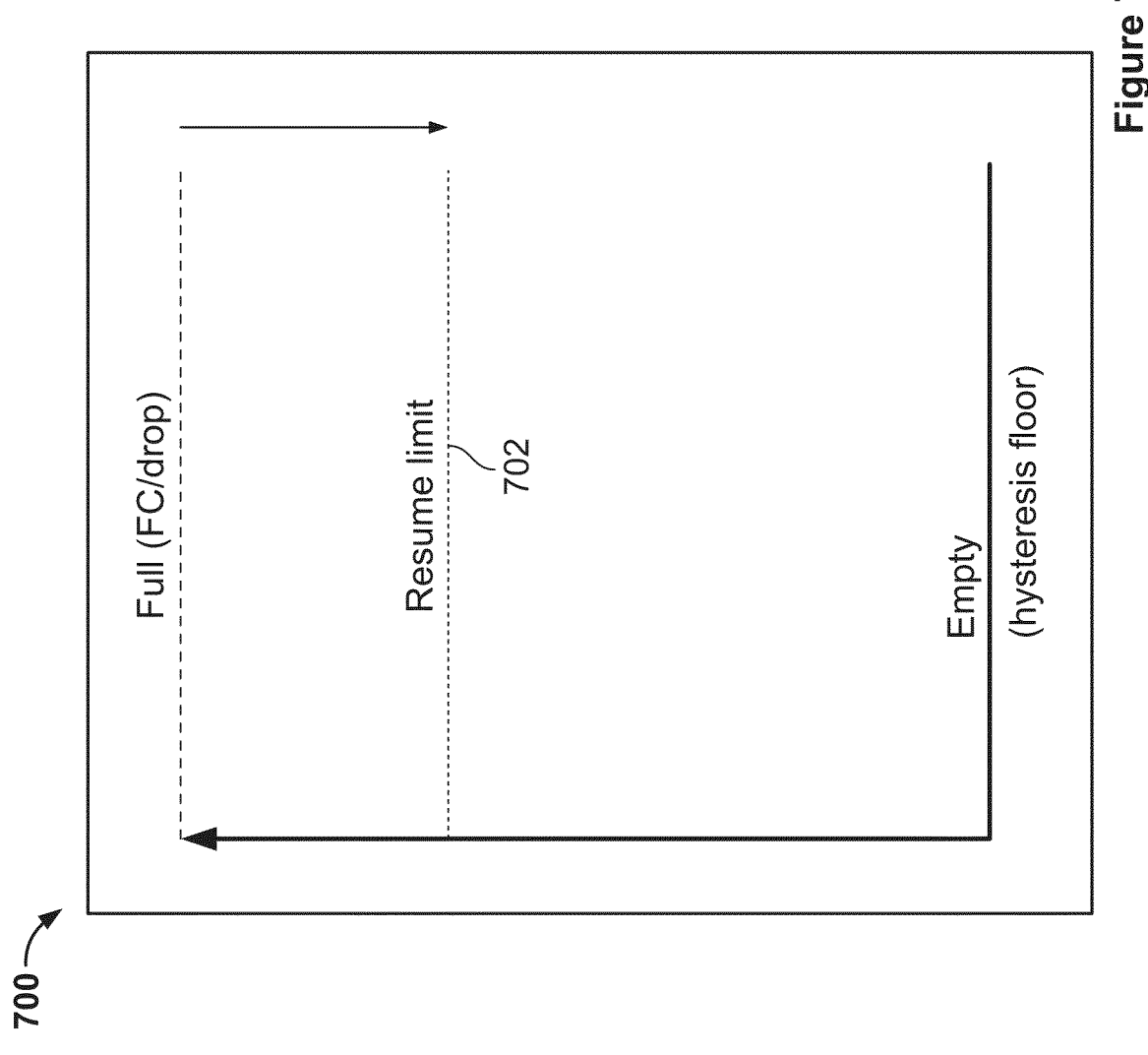
FIG. 7 illustrates an example floor for a resume threshold, according to some embodiments.

In some embodiments, C is also referred as a resume offset. The hysteresis using the resume offset C may be implemented for any threshold check that uses the shared region and results in setting of a drop state or generation of a flow control. In some embodiments, the resume offset C may be a single programmable value with a default value that allows for an MTU to be admitted, avoiding packet size based effects. The resume offset C may be used to calculate the resume threshold when the drop state or the PFC was generated. The resume threshold is the threshold when the entity i is fully drained before clearing the PFC or drop state. FIG. 7 illustrates a floor of zero below the resume threshold 702.

MOP Drop Policy

In some embodiments, packets from host ingress (HI) are not dropped. Packets from network ingress (NI), however, can be dropped at start of packet (SOP) time in order to avoid sending the packets to the purge path. At the level of queue, COS and port, overshoot is acceptable. But the global shared count may not overshoot.

There is an exception when a minimum guarantee space (min) space is available for an entity. Packets are admitted cell by cell in the min space, and any remaining cells are then absorbed in the shared space. However, if the shared space is exhausted, the incoming packet(s) will be dropped at middle of packet (MOP) time. This packet(s) will be sent to the purge path, and the Min cells and/or shared cells are only released upon dequeue from the purge queue.

Counter Increment/Decrement Flow Diagram

Figure 8A:
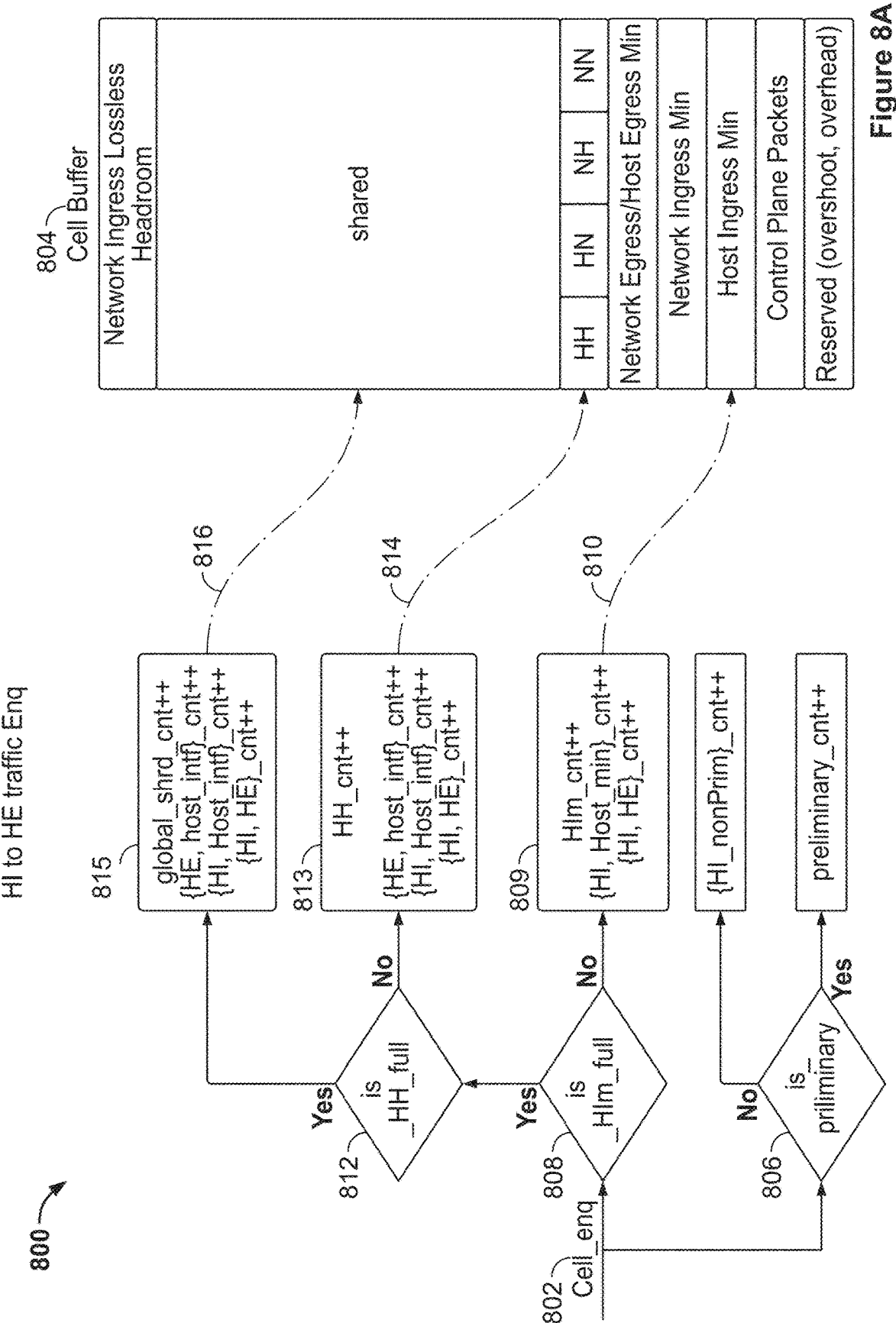
FIGS. 8A-8D illustrate an example admission control accounting for various types of traffic flow using counter increment mechanism, according to some embodiments.
Figure 8B:
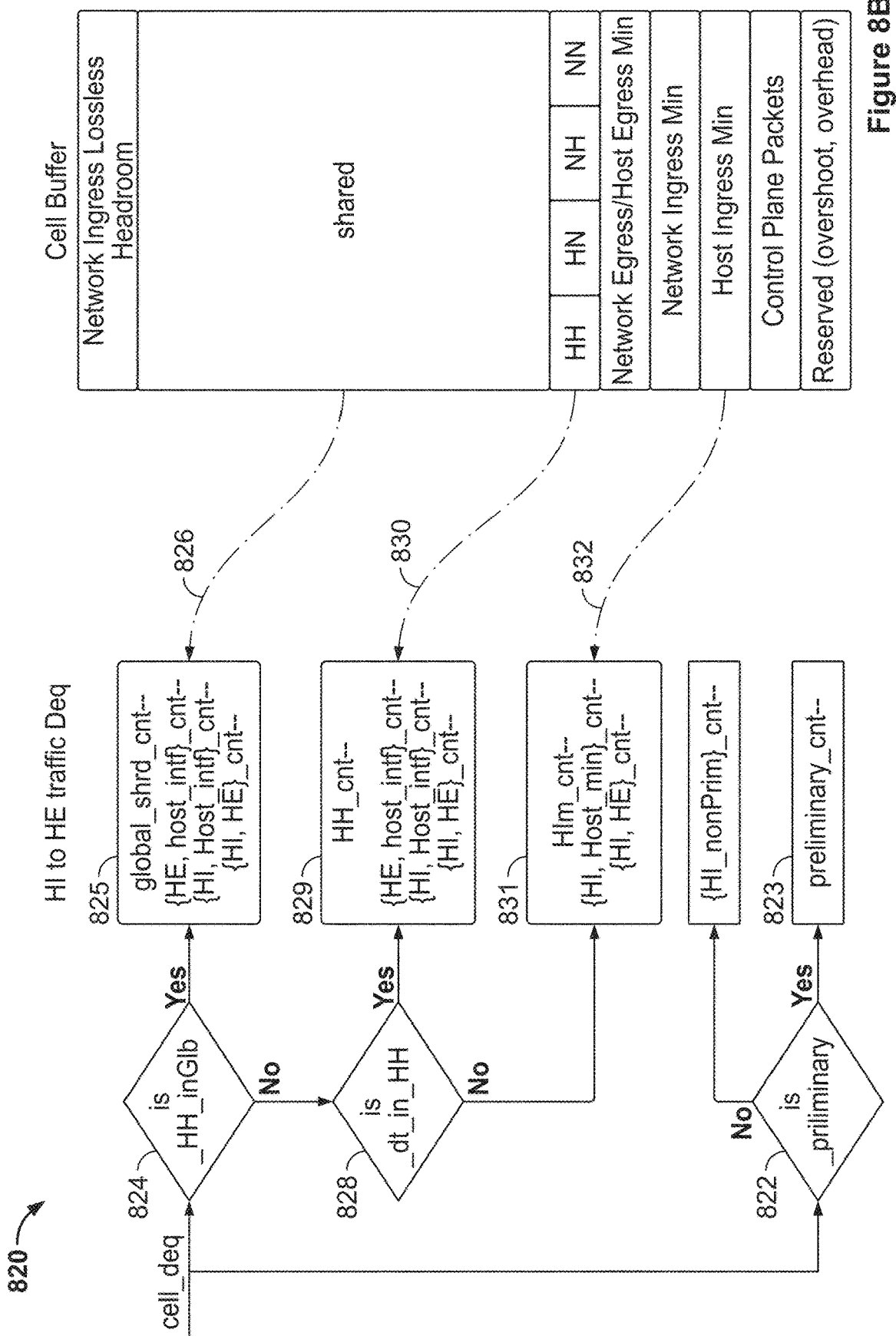
Figure 8C:
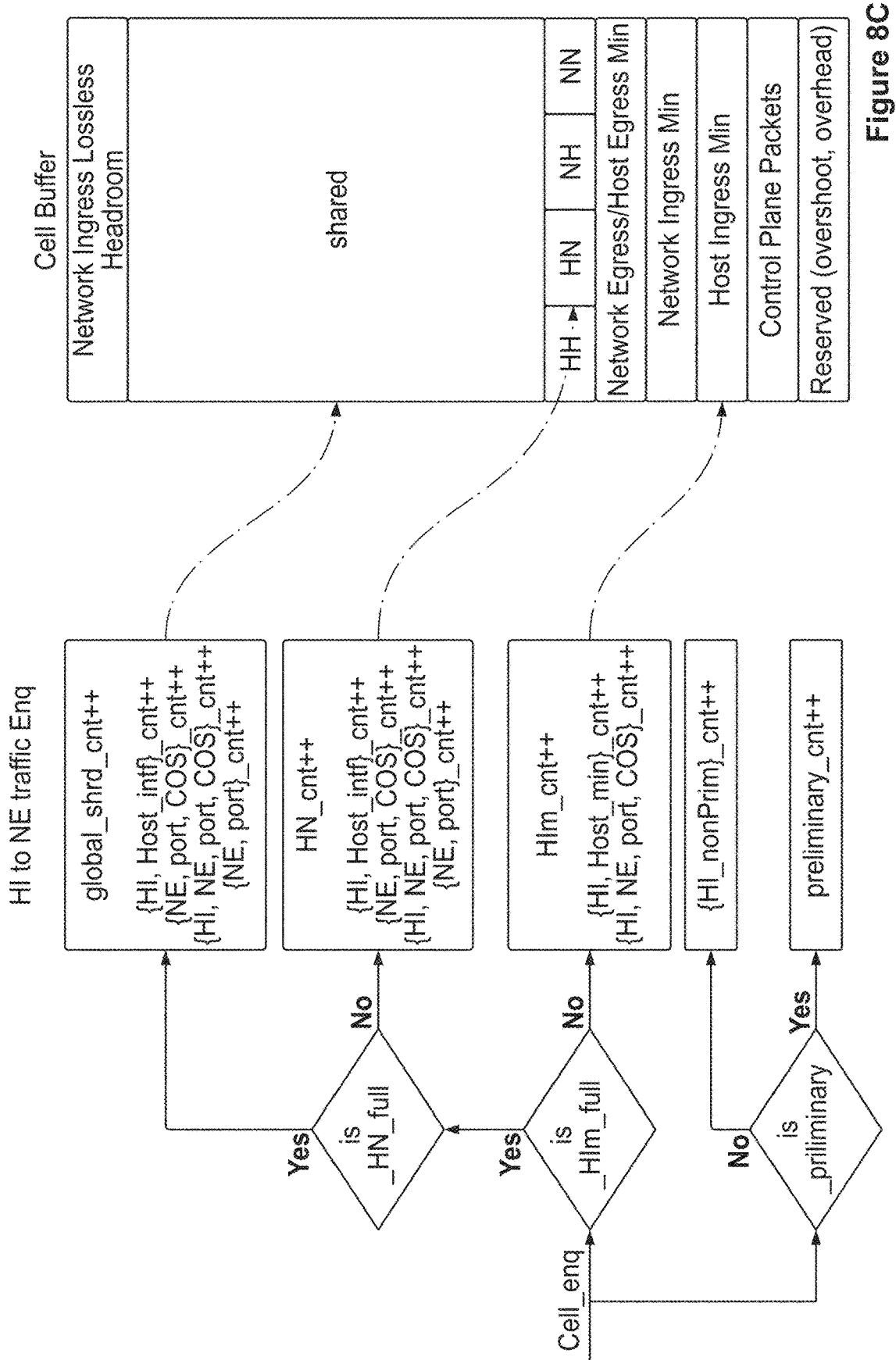
Figure 8D:
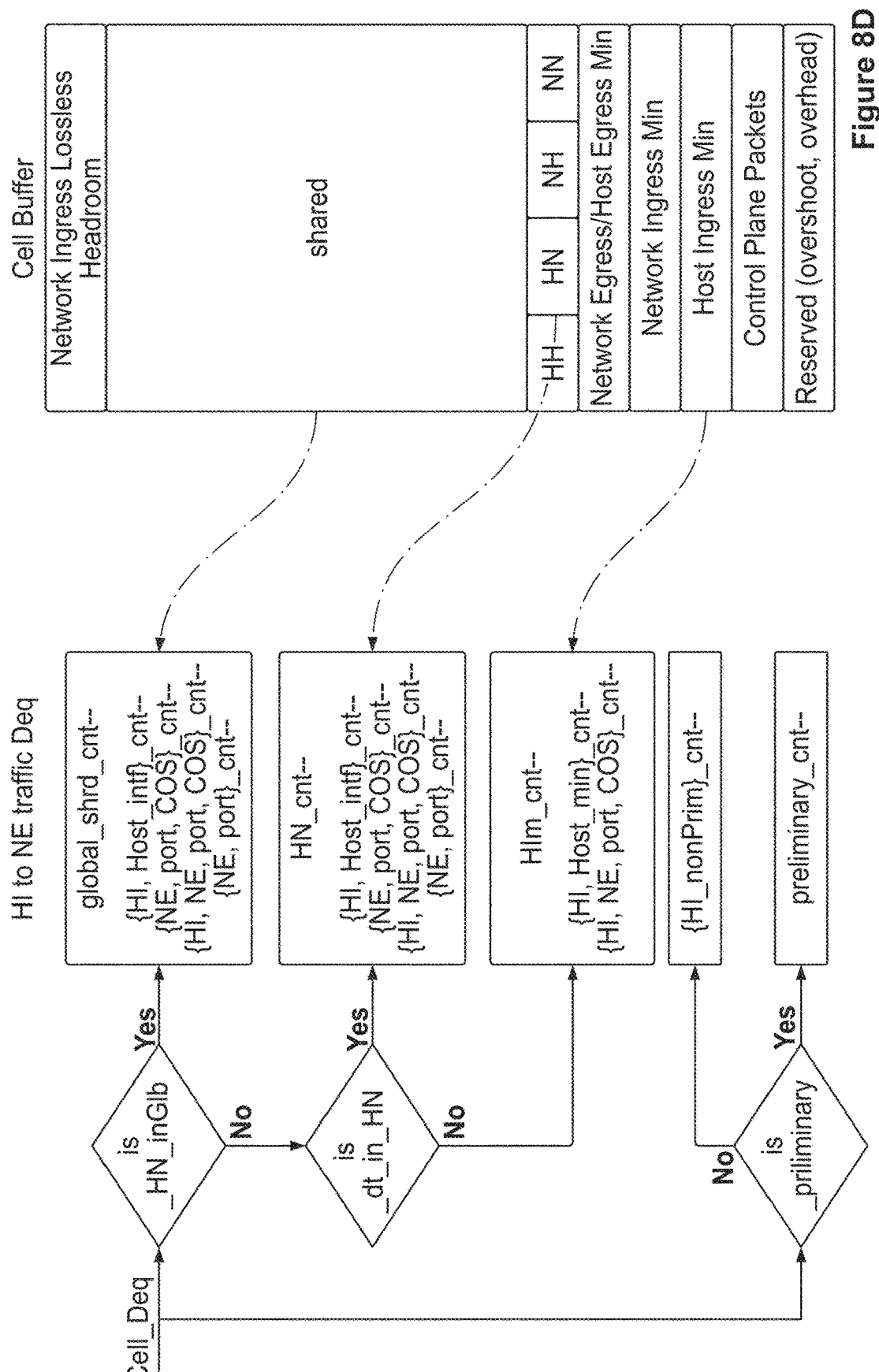

FIGS. 8A-8D illustrate admission control accounting for various types of traffic flow using counter increment mechanism. In some embodiments, the admission control accounting is performed in "cell" granularity, where a cell represents a certain number of packet bytes that are stored in a shared buffer as a single autonomous unit. The size of the cell is implementation-specific. In FIGS. 8A and 8C, cell_enq represents a cell being written into the shared buffer. In FIGS. 8B and 8D, cell_deq represents a cell that is read out from the shared buffer. The arrows in flow diagrams of FIGS. 8A-8D represent in which region the cell is being admitted or retrieved.

FIG. 8A illustrates a decision flowchart 800 for admission control accounting on HH traffic. The admission control is implemented based on the shared buffer occupancy for a given host ingress that receives a packet targeted to a host egress. The cell_enq 802 indicates this is admission control on ingress data of HH traffic.

When a cell is being written into cell buffer 804, i.e., shared buffer 102 in FIGS. 2-6, the cell is first classified to determine 806 if it includes regular packet data or overhead/preliminary packet data (e.g., excess data cause by network protocol headers). In some embodiments, each type of cells is counted separately, and these counters may allow policies to be setup based on limits for each type of cells.

If it is determined that the cell is an overhead cell, this cell will be accounted as part of the overhead buffer occupancy region. However, if the cell contains regular packet data, the admission control mechanism continues to check 808 the occupancy of the minimum guarantee space region allocated for host ingress (e.g., min for HI, 210b in FIG. 2). If this region is not full, its counter is incremented as in 809, and at least a portion of the cell is moved 810 to store in the corresponding minimum guarantee space region.

However, if the minimum guarantee space region for host ingress is full, it is determined 812 whether a dedicated shared buffer space can be used. Depending on the source and destination of the cell, in this example, the dedicated shared buffer space for host ingress to host egress (e.g., HH 212 in FIG. 2) is checked. If this region is not full, its counter is incremented as in 813, and at least a portion of the cell is moved 814 to store in the corresponding dedicated shared buffer space.

If the dedicated shared buffer space for HH is full, a global shared region counter is incremented in 815, and at least a portion of the cell will be moved 816 to the corresponding global shared space (e.g., shared space 204 in FIG. 2).

FIG. 8B illustrates a decision flowchart 820 for admission control accounting on HH traffic. The admission control is implemented when the cell/packet from FIG. 8A is removed from the shared buffer and sent to another host via a host egress port, which includes some operations that are opposite to those in FIG. 8A.

As depicted, it is first determined 822 whether the cell contains overhead or packet data. Depending on the received cell being an overhead cell or a regular cell, an appropriate counter is decremented. For example, if the cell is an overhead cell, the counter of overhead buffer region is decreased by one cell as in 823.

However, if the HH cell contains regular packet data, it is then determined 824 if the packet data occupies the global shared region. If the global shared region stores the cell/packet data, the appropriate counter for this region is decremented as in 825, and at least a portion of the cell/packet data is removed from the corresponding global shared region 826.

Next, if the global shared region does not store the cell, the occupancy of the HH dedicated shared space is tested 828. If this region is not empty, its counter is decremented 829, and at least a portion of the cell/packet data is removed from the corresponding HH dedicated shared space 830.

Finally, if the HH dedicated shared space is empty, the counter for the minimum guarantee space region allocated for host ingress is decremented 831, and at least a portion of the cell/packet data is removed from the corresponding HH dedicated shared space 832.

FIGS. 8C and 8D illustrate the admission control accounting decision flowcharts on HN traffic. The admission control is implemented based on the shared buffer occupancy for packets that are sourced by a host ingress and are targeted to a network egress port. The operation of these decision flowcharts are respectively similar to those described above for FIG. 8A and FIG. 8B, only in FIGS. 8C and 8D the occupancy of dedicated shared space for HN traffic is checked to be used by the HN traffic cells/packets. The operations shown by the flowcharts of FIGS. 8C and 8D are skipped for simplicity and clarity.

Implementation System

Figure 9:
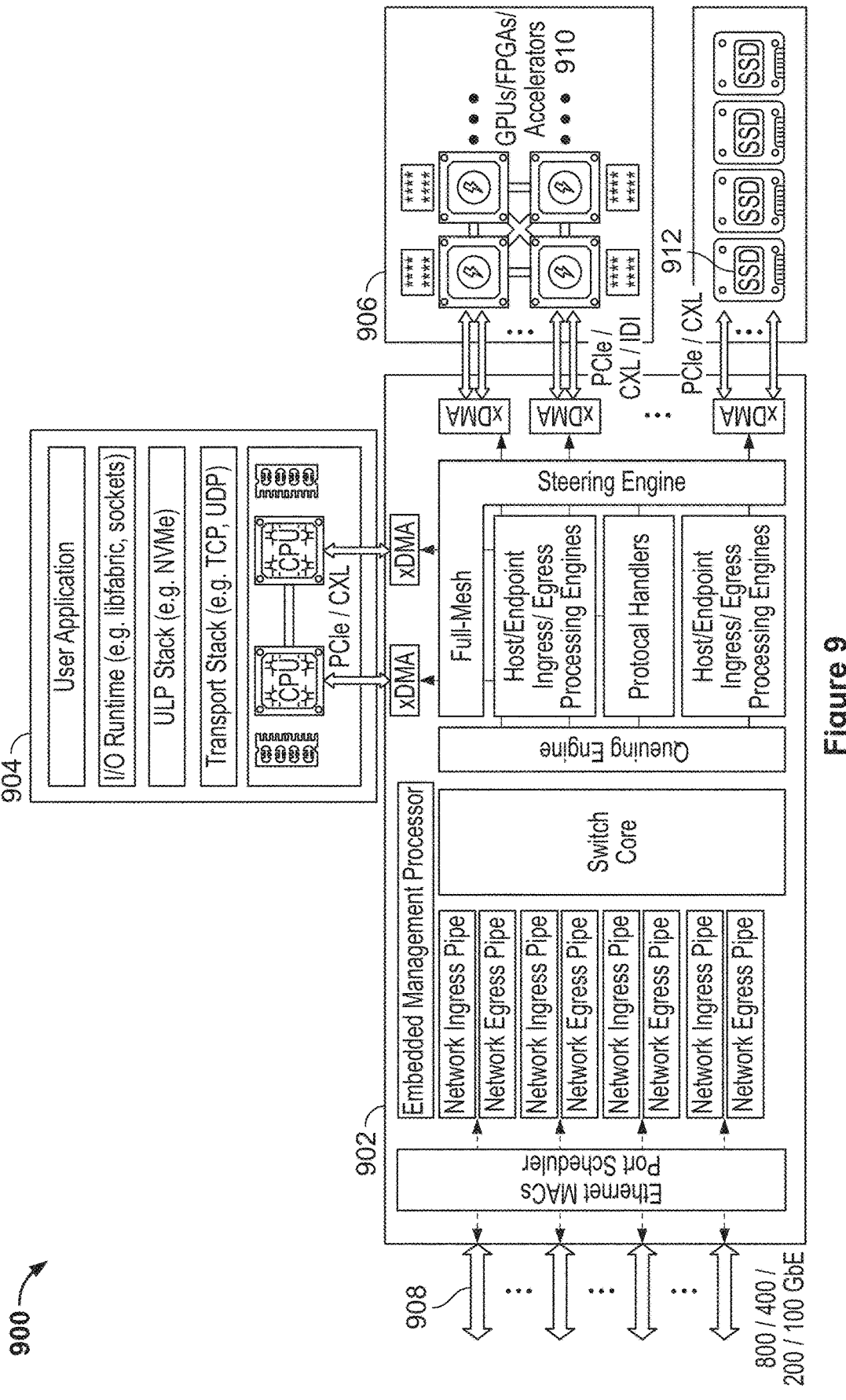
FIG. 9 illustrates an exemplary server fabric adapter architecture, according to some embodiments.

FIG. 9 illustrates an exemplary server fabric adapter architecture 900 for accelerated and/or heterogeneous computing systems, according to one embodiment. The server fabric adapter (SFA) 902 of FIG. 9 may be used to implement the architecture and processes described in FIGS. 1-8. SFA 902 connects to a plurality of controlling host CPUs, a plurality of endpoints such as storage (e.g., SSD) elements and/or xPUs (e.g., GPUs, accelerators, FPGAs, etc.), and a plurality of Ethernet ports to communicate with the rest of the data center network. The interfaces to CPUs and endpoints are shown as employing PCIe/CXL or similar memory-mapped I/O interfaces. In addition, SFA 902 may communicate with xPUs using wide, parallel inter-die interfaces such as Just a Bunch of Wires (JBOW).

SFA 902 of FIG. 9 is a scalable, disaggregated I/O hub that delivers multiple terabits-per-second of high-speed server I/O and network throughput across a composable, accelerated compute system. SFA 902 enables uniform, performant, elastic scale-up and scale-out of heterogeneous resources. SFA 902 provides for an open, high-performance, standards-based interconnect (800/400 GbE, PCIe Gen 5/6, CXL). SFA 902 also allows for I/O transport and upper layer processing under the full control of the host CPU's native networking stack.

The controlling host CPU(s) of FIG. 9 provide transport and upper layer protocol processing, act as a user application "Master," and provide infrastructure layer services. The endpoints (xPUs, storage) are producers and consumers of streaming data payloads within the communication packets. The Ethernet ports are switched, routed, and/or load balanced interfaces to the next tier of network switching/routing nodes in the data center infrastructure.

SFA 902 moves data at high throughput and low predictable latency between:

Network and Host
Network and Accelerator
Accelerator and Host
Accelerator and Accelerator
Host and Host
Network and Network An SFA, in its general form, is capable of separating arbitrary portions of network packets, such as transport headers, upper-layer protocol (ULP) headers, and payloads, and maps each portion of the packet to separate device PCIe address spaces. SFA 902 is also capable of moving those portions of packets over an arbitrary number of disjoint physical interfaces toward separate memory subsystems or even separate compute (CPU/xPU) subsystems. SFA 902 increases the aggregate packet data movement capacity of a network interface into heterogeneous systems consisting of CPUs, xPUs, and storage, and also can factor in the various physical interfaces capacity (bandwidth) attributes of each such heterogeneous computing component. The dynamic nature of the memory space associations performed by SFA 902 allows for very powerful failover system attributes for the processing elements that deal with the connectivity and protocol stacks of the system.

SFA system 900 is used in a data center network for accommodating applications such as distributed neural network training, ray-tracing graphics processing, or scientific computing, etc. SFA 902 also connects with controlling hosts 904 and endpoints 906 and communicates with the other portions of the data center network through Ethernet ports 908. Endpoints 906 may include GPU/FPGA/accelerator 910 and/or storage/memory element 912. In some embodiments, SFA system 900 may implement one or more of the following functionalities:

splitting a network packet into partial packets, e.g., a transport header, a ULP header, or a payload.

mapping a full packet or partial packets (e.g., payload) to and from a set of P endpoints 906, where P is an integer, and the P endpoints 206 are capable of arbitrary packet processing and/or packet storage.

mapping a full packet or partial packets (e.g. a transport header and a ULP header) to and from a set of N controlling hosts 904, where N is an integer, and the N controlling hosts 904 are capable of arbitrary packet processing or packet header processing.

maintaining dynamic associations between active sessions on any of the N controlling hosts 904 to the I/O buffers in any of the P endpoints 906.

performing arbitrary routing and capacity allocation from the network towards GPUs/FPGAs/accelerators 910, where the arbitrary routing and capacity allocation may include sharding and aggregation.

building arbitrary data flow pipelines, where data can reside on any device attached to SFA 902, and other similarly connected devices can access SFA 902 in a safe and isolated manner.

performing arbitrary homing of accelerators to compute complexes on a given SFA, with a low latency path for quick message passing and a high bandwidth path for streaming data amongst devices connected to the SFA.

In some embodiments, SFA 902 identifies the partial packet parts of a network packet that may constitute a header. SFA 902 also identifies a payload of the network packet at arbitrary protocol stack layers. The arbitrary protocol stack layers may include message-based protocols layered on top of byte stream protocols. SFA 902 makes flexible yet precise demarcations as to the identified header and payload. Responsive to identifying the header and payload, SFA 902 selects which parts or combinations of the header and payload should be sent to which set of destinations.

Unlike a NIC, SFA 902 enables a unified application and communication software stack on the same host complex. To accomplish this, SFA 902 transmits the transport headers and ULP headers exclusively to controlling hosts 904 although the controlling hosts may be different CPUs or different cores within the same CPU. As such, SFA 902 enables parallelized and decoupled processing of protocol layers in the host CPU, and further confines that layer of processing to dedicated CPUs or cores.

In some embodiments, SFA 902 provides protocol headers (e.g., transport headers) in a first queue, ULP headers in a second queue, and data/payload in a dedicated third queue, where the first, second, and third queues may be different queues. In this way, SFA 902 may allow the stack to make forward progress in parallel, and further allow a native mechanism with little contention where multiple CPUs or CPU cores can be involved in handling the packet if it is desired.

SFA 902 enables per-flow packet sequencing and coalesced steering per CPU core. Therefore, SFA system 900 allows a solution where a standard CPU complex with a familiar stack can be made a data processing unit (DPU) processor and achieve significantly higher performance. In some embodiments, the present SFA architecture 900 may also eliminate operational dependency on hidden NIC firmware from operators of the data center network.

In some embodiments, SFA 902 includes one or more per-port Ethernet MACs & port schedulers, one or more network ingress and egress processing pipelines, a switching core, one or more host/endpoint egress and ingress pipelines, one or more memory transactors (e.g., direct memory access (DMA) engines), and an embedded management processor. Surrounding the host/endpoint egress and ingress pipelines is a shared memory complex, which allows the SFA to directly buffer the packets to the corresponding flows instead of overprovisioning and stranding, or underprovisioning and dropping.

Flow Diagrams of Shared Buffer Management

Figure 10:
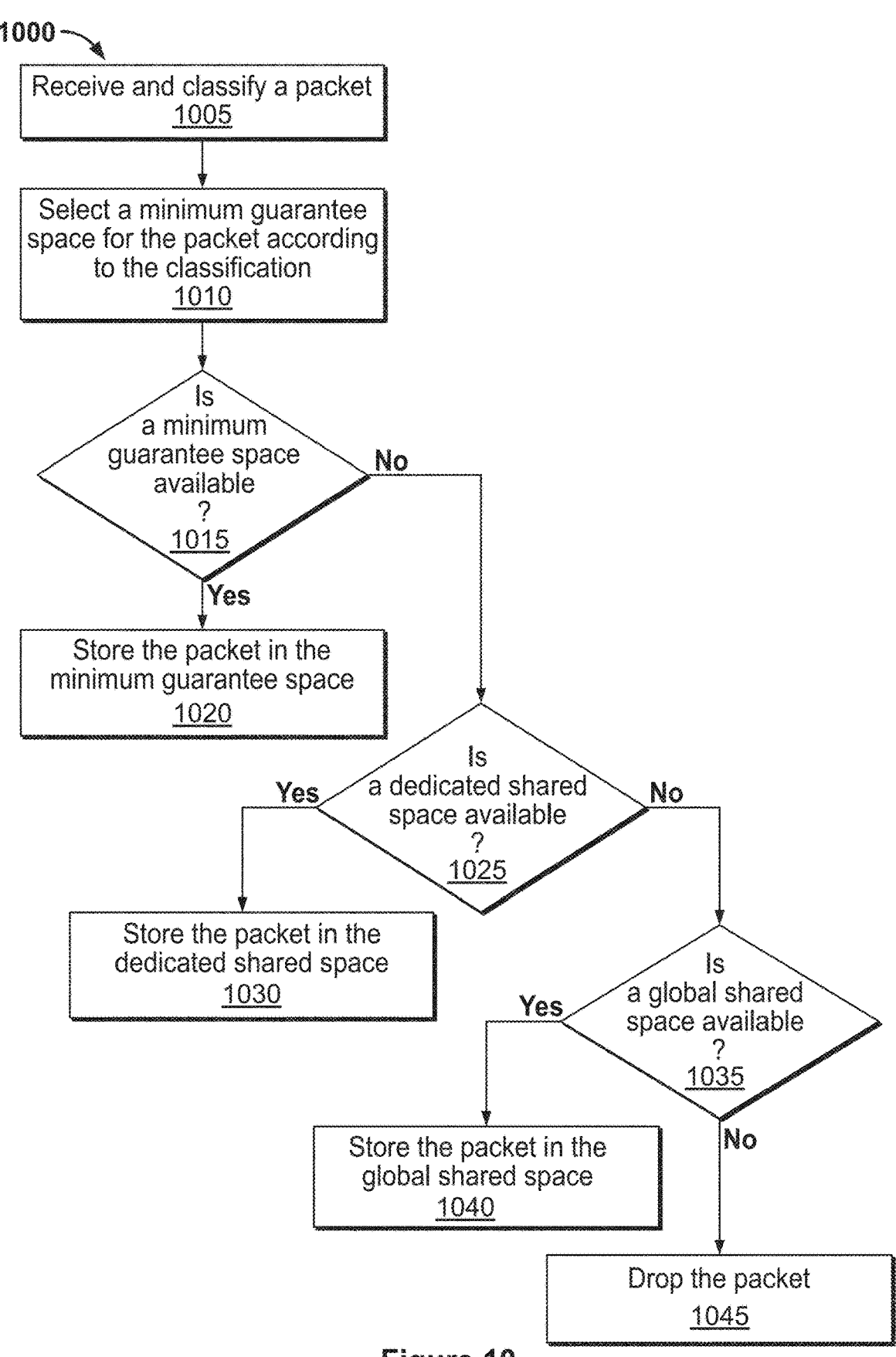
FIG. 10 illustrates an exemplary process of managing shared memory packet buffers, according to some embodiments.

FIG. 10 illustrates an exemplary process 1000 of managing shared memory packet buffers, according to some embodiments. In some embodiments, an SFA communication system includes a SFA that is configured to, at step 1005, receive and classify a packet as one of network-network, network-host, host-network, or host-host. In other words, the packet belongs to one of the traffic type of: network ingress to network egress (NN), network ingress to host egress (NH), host ingress to network egress (HN), and host ingress to host egress (HH).

The SFA is then configured to select a minimum guarantee space for the packet according to the classification at step 1010, and determine if the selected minimum guarantee space is available at step 1015. If the selected minimum guarantee space is available, at step 1020, the SFA is configured to store the packet in the minimum guarantee space allocated to the traffic type. Otherwise, method 1100 moves to step 1025, where the SFA is configured to determine if a dedicated shared space is available. If it is available, at step 1030, the SFA then stores the packet in the available dedicated shared space. However, if the dedicated shares space is not available, the SFA is further configured to determine if a global shared space is available at step 1035. If the global shared space is available, the SFA is configured to store the packet in the global shared space at step 1040. Otherwise, the packet is dropped at step 1045 (i.e., all buffer spaces are occupied). In case the packet belongs to a lossless flow, and if all the buffers are full or are about to become full, the receiver sends a request to the transmitter to stop transmission of additional packets associated with the lossless flow, so that such additional packets need not be dropped.

FIG. 11 illustrates an exemplary process 1100 of managing shared memory packet buffers, according to some embodiments. In some embodiments, an SFA communication system includes a SFA communicatively coupled to an ingress entity and another SFA communicatively coupled to an egress entity.

In some embodiment, at step 1105 the SFA is configured to receive ingress traffic of a traffic type. The ingress traffic can be a network ingress or a host ingress. The traffic type is one of network ingress to network egress (NN), network ingress to host egress (NH), host ingress to network egress (HN), and host ingress to host egress (HH).

The SFA then determines whether a minimum guarantee space (e.g., min space) of a shared buffer has been allocated for the ingress traffic. For example, a min space may not be configured and allocated to a lossy ingress traffic as shown in FIG. 5 above. At step 1110, the SFA determines that a min space is allocated to the ingress traffic. As a result, at step 1115, the SFA forwards packets of the ingress traffic to the shared buffer in a particular sequence of (1) the minimum guarantee space, (2) a dedicated shared space of the shared buffer allocated to the traffic type, and (3) a global shared space of the shared buffer. The dedicated shared space is available only to a particular traffic type while the global shared space is configured to be available to all traffic types.

In some embodiments, another SFA is also configured to: receive egress traffic of the traffic type, the egress traffic including the packets of the ingress traffic stored in the shared buffer; determine whether the egress traffic occupies the global shared space of the shared buffer; in response to determining the egress traffic occupies the global shared space, retrieve the egress traffic from the shared buffer in a particular sequence of (1) the global shared space. (2) the dedicated shared space of the shared buffer allocated to the traffic type, and (3) a minimum guarantee space allocated to the egress traffic; and send the retrieved traffic to the egress entity.

Additional Considerations

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 830 may be implemented in a distributed way over a network, for example as a server farm or a set of widely distributed servers, or may be implemented in a single computing device.

Although an example processing system has been described, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one."

The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for managing a shared memory for packet traffic, the method comprising:
   receiving and classifying a packet as one of: network-network, network-host, host-network, or host-host;
   selecting a minimum guarantee space for the packet according to the classification thereof;
   in response to the selected minimum guarantee space being available, storing the packet therein;
   in response to the selected minimum guarantee space being unavailable and a dedicated shared space being available, storing the packet in the dedicated shared space;
   in response to the selected minimum guarantee space and the dedicated shared space being unavailable and a global shared space being available, storing the packet in the global shared space; and
   in response to the selected minimum guarantee space, the dedicated shared space, and the global shared space being unavailable, dropping the packet.

2. A method for managing shared memory packet buffers, the method comprising:
   receiving ingress traffic of a traffic type at a server fabric adapter (SFA) communicatively coupled to an ingress entity;
   determining, by the SFA, whether a minimum guarantee space of a shared buffer has been allocated for the ingress traffic; and
   in response to determining the minimum guarantee space has been allocated for the ingress traffic, forwarding packets of the ingress traffic to the shared buffer in a particular sequence of (1) the minimum guarantee space, (2) a dedicated shared space, and (3) a global shared space, wherein the dedicated shared space is part of the shared buffer allocated to the traffic type after the minimum guarantee space and a headroom have been allocated, and the global shared space is a portion of the shared buffer after the dedicated shared space has been allocated.

3. The method of claim 2, wherein:
   the ingress entity is one of a host or network entity,
   the ingress traffic is one of lossy or lossless traffic, and
   the traffic type includes one of network ingress to network egress, network ingress to host egress, host ingress to network egress, and host ingress to host egress.

4. The method of claim 2, wherein:
   the minimum guarantee space is configured to be available to network ingress traffic or host ingress traffic,
   the dedicated shared space is configured to be available only to a particular traffic type, and
   the global shared space is configured to be available to all traffic types.

5. The method of claim 2, wherein the ingress traffic is lossy traffic, the method further comprising:
   in response to determining the minimum guarantee space has not been allocated for the ingress traffic, forwarding the packets of the ingress traffic to the shared buffer in a sequence of (1) the dedicated shared space of the shared buffer allocated to the traffic type and (2) the global shared space of the shared buffer.

6. The method of claim 2, wherein forwarding the packets of the ingress traffic to the shared buffer in the particular sequence comprises:
   computing a threshold for the ingress entity based on the global shared space and dedicated shared space available to the ingress entity;
   determining occupancy of the shared buffer at the ingress entity;
   comparing the determined occupancy with the computed threshold; and
   taking action to reduce the occupancy of the shared buffer when the determined occupancy exceeds the computed threshold.

7. The method of claim 6, wherein the action includes one of discarding packets of the ingress traffic or triggering priority flow control.

8. The method of claim 7, further comprising implementing hysteresis by continuing the action until the occupancy reaches a level lower than the threshold.

9. The method of claim 2, wherein forwarding the packets of the ingress traffic to the shared buffer in the particular sequence comprises:
   determining whether the minimum guarantee space allocated for the ingress traffic is full, wherein the ingress traffic is a host ingress or network ingress;
   in response to determining the minimum guarantee space is not full, incrementing a counter associated with the minimum guarantee space and moving at least a portion of the ingress traffic to the minimum guarantee space; and
   in response to determining the minimum guarantee space is full, determining whether the dedicated shared space for the ingress traffic is full, wherein the dedicated shared space is allocated based on the traffic type of the ingress traffic;
      in response to determining the dedicated shared space is not full, incrementing a counter associated with the dedicated shared space and moving at least a portion of the ingress traffic to the dedicated shared space; and
      in response to determining the dedicated shared space is full, incrementing a counter associated with the global shared space and moving at least a portion of the ingress traffic to the global shared space.

10. The method of claim 2, wherein the minimum guarantee space, the dedicated shared space, and the global shared space are carved out of the shared buffer through configuration.

11. The method of claim 2, further comprising:
   receiving egress traffic of the traffic type at a second server fabric adapter (SFA) communicatively coupled to an egress entity, the egress traffic including the packets of the ingress traffic stored in the shared buffer;
   determining, by the second SFA, whether the egress traffic occupies the global shared space of the shared buffer;
   in response to determining the egress traffic occupies the global shared space, retrieving the egress traffic from the shared buffer in a particular sequence of (1) the global shared space, (2) the dedicated shared space of the shared buffer allocated to the traffic type, and (3) a minimum guarantee space allocated to the egress traffic; and
   sending the retrieved traffic to the egress entity.

12. A system for managing shared memory packet buffers, the system comprising:

a server fabric adapter (SFA) communicatively coupled to an ingress entity, the SFA configured to:

receive ingress traffic of a traffic type;

determine whether a minimum guarantee space of a shared buffer has been allocated for the ingress traffic; and in response to determining the minimum guarantee space has been allocated for the ingress traffic, forward packets of the ingress traffic to the shared buffer in a particular sequence of (1) the minimum guarantee space, (2) a dedicated shared space, and (3) a global shared space, wherein the dedicated shared space is part of the shared buffer allocated to the traffic type after the minimum guarantee space and a headroom have been allocated, and the global shared space is a portion of the shared buffer after the dedicated shared space has been allocated.

13. The system of claim 12, wherein:

the ingress entity is one of a host or network entity, the ingress traffic is one of lossy or lossless traffic, and the traffic type includes one of network ingress to network egress, network ingress to host egress, host ingress to network egress, and host ingress to host egress.

14. The system of claim 12, wherein:

the minimum guarantee space is configured to be available to network ingress traffic or host ingress traffic, the dedicated shared space is configured to be available only to a particular traffic type, and the global shared space is configured to be available to all traffic types.

15. The system of claim 12, wherein the ingress traffic is lossy traffic, and the SFA is further configured to:

in response to determining the minimum guarantee space has not been allocated for the ingress traffic, forward the packets of the ingress traffic to the shared buffer in a sequence of (1) the dedicated shared space of the shared buffer allocated to the traffic type and (2) the global shared space of the shared buffer.

16. The system of claim 12, wherein to forward the packets of the ingress traffic to the shared buffer in the particular sequence, the SFA is further configured to:

compute a threshold for the ingress entity based on the global shared space and dedicated shared space available to the ingress entity;

determine occupancy of the shared buffer at the ingress entity;

compare the determined occupancy with the computed threshold; and take action to reduce the occupancy of the shared buffer when the determined occupancy exceeds the computed threshold.

17. The system of claim 16, wherein the action includes one of discarding packets of the ingress traffic or triggering priority flow control.

18. The system of claim 17, wherein the SFA is further configured to implement hysteresis by continuing the action until the occupancy reaches a level lower than the threshold.

19. The system of claim 12, wherein to forward the packets of the ingress traffic to the shared buffer in the particular sequence, the SFA is further configured to:

determine whether the minimum guarantee space allocated for the ingress traffic is full, wherein the ingress traffic is a host ingress or network ingress;

in response to determining the minimum guarantee space is not full, increment a counter associated with the minimum guarantee space and move at least a portion of the ingress traffic to the minimum guarantee space; and in response to determining the minimum guarantee space is full, determine whether the dedicated shared space for the ingress traffic is full, wherein the dedicated shared space is allocated based on the traffic type of the ingress traffic;

in response to determining the dedicated shared space is not full, increment a counter associated with the dedicated shared space and move at least a portion of the ingress traffic to the dedicated shared space; and in response to determining the dedicated shared space is full, increment a counter associated with the global shared space and move at least a portion of the ingress traffic to the global shared space.

20. The system of claim 12, further comprising:

a second SFA communicatively coupled to an egress entity, the second SFA configured to:

receive egress traffic of the traffic type, the egress traffic including the packets of the ingress traffic stored in the shared buffer;

determine whether the egress traffic occupies the global shared space of the shared buffer;

in response to determining the egress traffic occupies the global shared space, retrieve the egress traffic from the shared buffer in a particular sequence of (1) the global shared space, (2) the dedicated shared space of the shared buffer allocated to the traffic type, and (3) a minimum guarantee space allocated to the egress traffic; and send the retrieved traffic to the egress entity.

\* \* \* \* \*